United States Patent
Mittal et al.

(10) Patent No.: US 11,544,475 B2
(45) Date of Patent: Jan. 3, 2023

(54) SYSTEM AND METHOD FOR PROVIDING A MODEL-BASED INTELLIGENT CONVERSATIONAL AGENT

(71) Applicant: Predictika Inc., Fremont, CA (US)

(72) Inventors: Sanjay Mittal, Fremont, CA (US); Awhan Patnaik, Pune (IN)

(73) Assignee: Predictika Inc., Fremont, CA (US)

( * ) Notice: Subject to any disclaimer, the term of this patent is extended or adjusted under 35 U.S.C. 154(b) by 204 days.

(21) Appl. No.: 16/827,158

(22) Filed: Mar. 23, 2020

(65) Prior Publication Data

US 2020/0302123 A1 Sep. 24, 2020

Related U.S. Application Data

(60) Provisional application No. 62/822,325, filed on Mar. 22, 2019.

(51) Int. Cl.
*G10L 15/22* (2006.01)
*G06F 40/40* (2020.01)
(Continued)

(52) U.S. Cl.
CPC ............. *G06F 40/40* (2020.01); *G06N 20/00* (2019.01); *H04L 51/02* (2013.01)

(58) Field of Classification Search
CPC ......... G10L 15/22; G10L 15/00; G10L 15/04; G10L 15/06; G10L 15/063; G10L 15/065; G10L 15/18; G10L 15/183; G10L 15/19; G10L 15/193; G10L 15/197; G10L 15/20; G10L 15/26; G10L 15/28; G10L 2015/0631–0638; G10L 2015/221–228;
(Continued)

(56) References Cited

U.S. PATENT DOCUMENTS 6,950,782 B2  9/2005  Qiao et al.
7,305,345 B2  12/2007  Bares et al.
(Continued)

FOREIGN PATENT DOCUMENTS

AU  2017203847 B2  6/2017
AU  2019200296 A1  2/2019
WO  2002073331 A2  9/2002

OTHER PUBLICATIONS

Articulab Carnegie Mellon University, SARA: The Socially Aware Robot Assistant, Jul. 3, 2016, 26 pgs., http://articulab.hcii.cs.cmu.edu/projects/sara/.

(Continued)

*Primary Examiner* — Qi Han
(74) *Attorney, Agent, or Firm* — Moyles IP, LLC

(57) ABSTRACT

A method of providing a conversational agent for interacting with a user may include declaratively defining a task model of a task using a task modelling language, storing the task model in a computer-readable storage medium, generating a natural language grammar based on the task model, storing the natural language grammar in the computer-readable storage medium, receiving a user input from the user, interpreting the user input with a processor based on the task model and the natural language grammar, generating an agent response to the user input with the processor based on the task model, and communicating the agent response to the user.

20 Claims, 13 Drawing Sheets

(51) Int. Cl.
*H04L 51/02* (2022.01)
*G06N 20/00* (2019.01)

(58) Field of Classification Search
CPC ...... G06F 40/211; G06F 40/10; G06F 40/151;
G06F 40/154; G06F 40/16; G06F 40/174;
G06F 40/186; G06F 40/20; G06F 40/205;
G06F 40/226; G06F 40/253; G06F
40/279; G06F 40/295; G06F 40/35; G06F
40/40; G06F 40/47; G06F 40/56
USPC ........ 704/9, 1, 2, 243, 250, 255, 257, 270.1,
704/275
See application file for complete search history.

(56) References Cited

U.S. PATENT DOCUMENTS

| | | | |
|---|---|---|---|
| 7,574,362 | B2 | 8/2009 | Walker et al. |
| 8,738,739 | B2 | 5/2014 | Makar et al. |
| 9,369,410 | B2 | 6/2016 | Capper et al. |
| 9,922,642 | B2 | 3/2018 | Pitschel et al. |
| 9,971,766 | B2 | 5/2018 | Pasupalak et al. |
| 10,224,035 | B1 | 3/2019 | Koenig et al. |
| 10,379,715 | B2 | 8/2019 | Napolitano et al. |
| 2014/0278413 | A1* | 9/2014 | Pitschel .................. G10L 15/22 704/243 |
| 2018/0196683 | A1 | 7/2018 | Radebaugh et al. |
| 2018/0308481 | A1 | 10/2018 | Cohen et al. |
| 2019/0042988 | A1 | 2/2019 | Brown et al. |
| 2019/0124020 | A1 | 4/2019 | Bobbarjung et al. |
| 2019/0156206 | A1 | 5/2019 | Graham et al. |
| 2019/0158433 | A1 | 5/2019 | Yun et al. |
| 2019/0197111 | A1* | 6/2019 | Garrote .................. G06F 40/30 |
| 2019/0205379 | A1 | 7/2019 | Takiel |
| 2019/0205386 | A1 | 7/2019 | Kumar et al. |
| 2020/0065377 | A1* | 2/2020 | Hirzel ..................... G10L 15/22 |

OTHER PUBLICATIONS

Fang et al, Sounding Board A User-Centric and Content-Driven Social Chatbot, University of Washington, Apr. 26, 2018, 5 pgs., https://arxiv.org/pdf/1804.10202.pdf.

Jeeva, Conversational AI: Understanding the Basics and Building a Chatbot in Rasa module, Nov. 3, 2018, 8 pgs., https://chatbotslife.com/conversational-ai-understanding-the-basics-and-a-chatbot-build-in-rasa-module-c23828307180.

Lanwani et al., Implementation of a Chatbot System using AI and NLP, International Journal of Innovative Research in Computer Science & Technology, vol. 6, Issue—3, May 2018, 5 pgs., https://www.ijircst.org/DOC/2_IRP620.pdf.

* cited by examiner

SYSTEM AND METHOD FOR PROVIDING A MODEL-BASED INTELLIGENT CONVERSATIONAL AGENT

CROSS-REFERENCE TO RELATED APPLICATIONS

This application claims the benefit of U.S. Provisional Application No. 62/822,325, filed Mar. 22, 2019, which is incorporated herein by reference in its entirety.

TECHNICAL FIELD

Embodiments of the present disclosure generally relate to an intelligent conversational agent, and more specifically to a system and method for providing a model-based intelligent conversational agent.

STATEMENT REGARDING COMPUTER PROGRAM LISTINGS

The present application incorporates by reference the following ASCII .txt files submitted concurrently with this application via EFS-Web:

TABLE 1

Attached Computer Program Listings Incorporated by Reference

| File name | File Creation Date | File size (in bytes) |
|---|---|---|
| allpizza.txt | March 16, 2020 | 8653 |
| autobot.txt | March 16, 2020 | 1443 |
| BMWBaseModels.txt | March 16, 2020 | 8856 |
| bmwbodytop_csv.txt | March 16, 2020 | 16695 |
| BMWSelectCar_flex.txt | March 16, 2020 | 13788 |
| byopizza.txt | March 16, 2020 | 10565 |
| DealerActions.txt | March 16, 2020 | 6751 |
| Desserts.txt | March 16, 2020 | 1170 |
| Dip.txt | March 16, 2020 | 1122 |
| Drinks.txt | March 16, 2020 | 1373 |
| Pasta.txt | March 16, 2020 | 4976 |
| pizzahutbasemodels.txt | March 16, 2020 | 22073 |
| PizzaHutOrderNM.txt | March 16, 2020 | 11217 |
| Sides.txt | March 16, 2020 | 2200 |
| Wings.txt | March 16, 2020 | 1474 |

BACKGROUND

The history of consumer computing has gone through key transitions. Starting in the 1960's came giant mainframes housed in big secure buildings that were programmed and used by a few users only. Late 1970's and early 1980's brought workstations and personal computers that decentralized and democratized computing. Most users were still programmers, though there were 'dumb terminals' for information workers. The Internet in the mid-1990's opened up computing to the masses, which allowed one to use a browser to get things done without programming and Internet allowed information and computing to be shared worldwide.

Personal smart phones connected to the Internet were introduced around 2009-2010 and the "app" (i.e., applications including computer or software programs) economy was pushed to the limits by major tech companies, which led to a number of good and bad apps and simple and complex apps. The apps allow the everyday user to complete lots of tasks on the go. By 2015, it was clear that the younger users were spending over 50% of their time inside messaging apps. With another 30% of time being accounted by other categories such as email, browser or search, games, map, calendar, etc.

Recognizing this key trend, major companies such as Google, Facebook, Microsoft, Apple started opening their messaging apps with Application Programming Interfaces (APIs) that allow the use of automated programs such as Chatbots, Conversational Agents, Voice-based agents. The automated programs utilize artificial intelligence (AI) technologies such as machine learning, speech understanding and natural language processing to provide a seamless way for business to work with their users inside these messaging apps. This kind of conversational interaction with automated agents based on AI is a major paradigm shift, perhaps, even more important than the transition from desktop to mobile devices.

Moreover, speech-to-text and text-to-speech cloud-based technologies are becoming very close to human capabilities where consumers can get a lot of their computation related work done simply by conversing with these automated agents without needing computers or even smartphones. This technology could be incorporated in a simple device with a microphone, a speaker, and Internet connectivity.

Virtual Agents (VA) offer businesses always-on 24×7 2-way communication channel with their customers. Since these agents are used inside authenticated messaging programs, businesses "know" who the customer is and can personalize their communication based on customer's prior interaction and transactional history, location, time of day, and other criteria. Further, the customer's virtual agents provide a very seamless way to talk to businesses in natural language over the entire range of interaction needs from getting information, learning about services, customer support, scheduling and status updates, and completing business transactions. However, most of the current technologies suffer from one or more of the following limitations or drawbacks for building conversational virtual agents.

One drawback is the virtual agents require a large set of tagged sentences for intent identification and entity extraction. This presents multiple problems. One, reliance on a data set of sentences is very error prone since it is very hard to get a representative data set that covers enough customer interaction scenarios. This problem is compounded in most real business use cases which involve multiple entities. In such cases, the number of sentences needed can be exponentially large in the number of fully instantiated entities since these entities can be expressed in many permutations and combinations. Two, the process of tagging each sentence in the data set with the appropriate entities is very tedious and labor intensive. For both of these reasons, it is hard to get error-free coverage of anything but a narrow range of narrowly scripted interaction scenarios.

Another drawback is supporting business processes that involve multiple steps especially when there are inter-dependencies between the steps and do not follow simple linear flows. Examples of such business processes that involve multiple steps include: insurance sign-up; investment advisory applications; product selection and configuration; claims adjudication; marketing leads qualification; and business logic around large number of business tasks. Current virtual agent tools have very little support for providing flexible dialogs, making it very hard to deal with interacting steps due to the combinatorial complexity of the interactions between task steps. Thus, most virtual agents have tightly scripted dialog flows that are unsuitable for natural conversations that human users are used to in their human-to-human conversations.

Yet another drawback is the VA's inability to allow users to ask questions in response to a question from the VA, i.e., users can not interrupt the virtual agent with clarifying questions or ask for explanation.

Yet another drawback is lack of support for business logic, especially, business rules and constraints that the virtual agent needs to follow as part of its task. This lack of support becomes pronounced when such logic eliminates certain choices for users and they need to get an explanation of why certain choices are disallowed.

Conversational agents need to do more than just answer a question. A dialog requires maintaining context and being able to change the choices made by the user and thereby change the dialog flow. No support for this is provided by the existing technologies. Each developer has to write code to maintain context.

The same virtual agent can be accessed by a user in many ways: as a chatbot on a website, inside a mobile app, within messaging app, or through voice-enabled agents. Each of these modalities have different ways of interacting with the user or presenting choices. Currently, no single technology can support all these modalities. Thus, developers have to create separate virtual agents to support different modes of user interaction.

Henceforth, there is a need for a system and method for providing a model-based intelligent conversational agent that addresses foregoing discussed issues.

BRIEF DESCRIPTION OF THE EXEMPLARY EMBODIMENTS

An exemplary embodiment of a method of providing an artificial intelligence conversational agent for interacting with a user may include declaratively defining a task model of a task using a task modelling language, storing the task model in a computer-readable storage medium, generating a natural language grammar based on the task model, storing the natural language grammar in the computer-readable storage medium, receiving a user input from the user, interpreting the user input with a processor based on the task model and the natural language grammar, generating an agent response to the user input with the processor based on the task model, and communicating the agent response to the user.

An exemplary embodiment of an artificial intelligence conversational system for interacting with a user to complete a task may include a processor and a computer-readable storage medium operably connected to the processor. The computer-readable storage medium may store therein a task model of the task. The task model may be declaratively defined using a task modelling language. The computer-readable storage medium may further store therein a natural language grammar based on the task model. The processor may be configured to perform receiving a user input from the user, interpreting the user input based on the task model and the natural language grammar, generating an agent response to the user input based on the task model, and communicating the agent response to the user.

An exemplary embodiment of a non-transitory computer-readable medium may store computer executable instructions. The computer executable instructions, when executed by a computer comprising a processor and a computer-readable storage, may cause the computer to perform declaratively defining a task model of a task using a task modelling language, storing the task model in the computer-readable storage, generating a natural language grammar based on the task model, storing the natural language grammar in the computer-readable storage, receiving a user input from the user, interpreting the user input with the processor based on the task model and the natural language grammar, generating an agent response to the user input with the processor based on the task model, and communicating the agent response to the user.

Other features and aspects of the exemplary embodiments will become apparent from the following detailed description. It should be understood, however, that the detailed description and the specific examples, while indicating specific embodiments of the disclosure, are given by way of illustration only, since various changes and modifications within the spirit and scope of the disclosure will become apparent to those skilled in the art from this detailed description.

BRIEF DESCRIPTION OF DRAWINGS

A more particular description will be rendered by reference to specific embodiments thereof that are illustrated in the appended drawings. Understanding that these drawings depict only typical embodiments thereof and are not therefore to be considered to be limiting of its scope, exemplary embodiments herein will be better understood from the following detailed description with reference to the drawings, in which.

Figure 1:
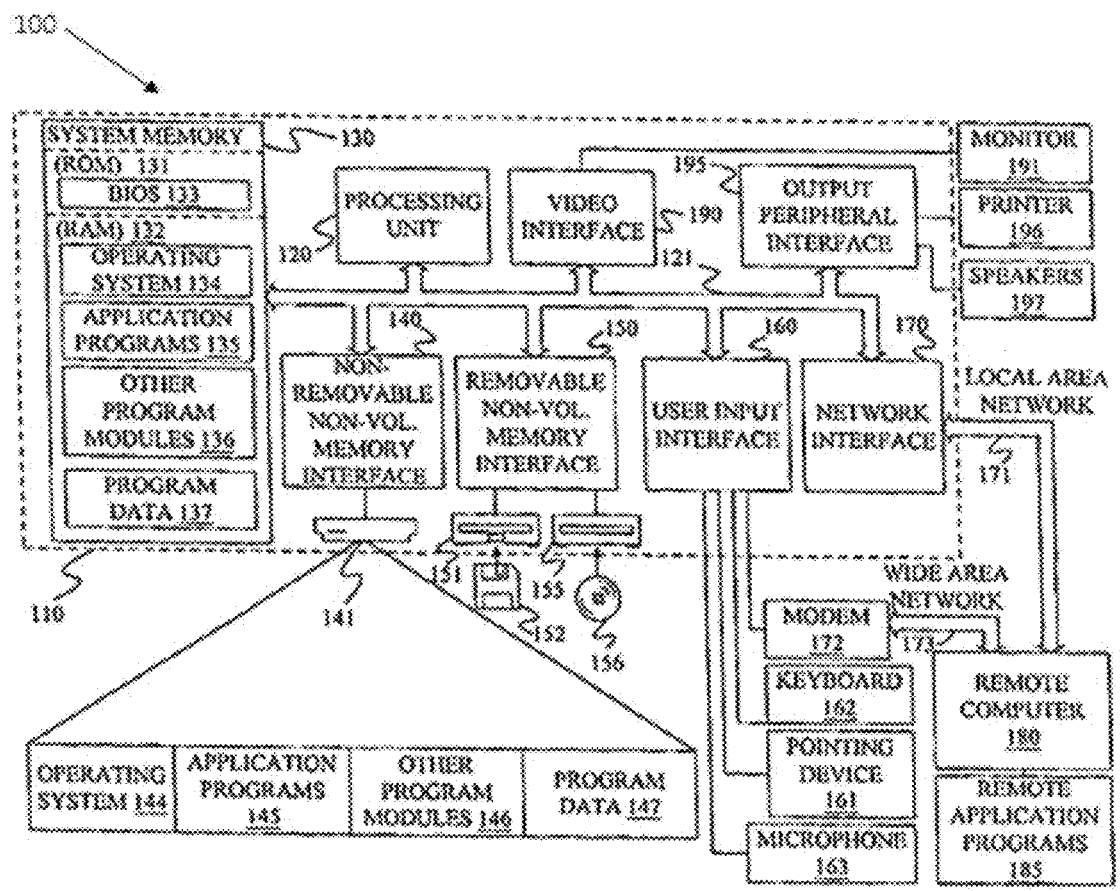
FIG. 1 is a general block diagram of a computing system, according to an exemplary embodiment.

Various features, aspects, and advantages of the exemplary embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to limit the scope of the description or the claims. To facilitate understanding, reference numerals have been used, where possible, to designate like elements common to the figures.

DETAILED DESCRIPTION OF THE EXEMPLARY EMBODIMENTS

Reference will now be made in detail to various embodiments. Each example is provided by way of explanation, and is not meant as a limitation and does not constitute a definition of all possible embodiments. The described embodiments are to be considered in all respects only as illustrative and not restrictive.

For purposes of illustrating features of the embodiments, an example will now be introduced and referenced throughout the disclosure. Those skilled in the art will recognize that this example is illustrative and not limiting and is provided purely for explanatory purposes. FIG. 1 illustrates an example of a computing system environment 100. The computing system environment 100 illustrated is not intended to suggest any limitation as to the scope of use or functionality of the system and method described herein. Neither should the computing environment 100 be interpreted as having any dependency or requirement relating to any one or combination of components illustrated in the exemplary operating environment 100.

Embodiments of the disclosure are operational with numerous other general purpose or special purpose computing system environments or configurations. Examples of computing systems, environments, and/or configurations that may be suitable for use with the systems and methods described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The embodiments of the disclosure may be described in the general context of computer-executable instructions, such as program modules, being executed by a computer. Generally, program modules may include routines, programs, objects, components, data structures, etc. that perform particular tasks or implement particular abstract data types. The systems and methods described herein may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the exemplary embodiments as processor executable instructions, which can be written on any form of a computer readable media in a corresponding computing environment according to this disclosure.

With reference to FIG. 1, an exemplary system for implementing embodiments of the present disclosure includes a general-purpose computing device in the form of a computer 110. Components of computer 110 may include, but are not limited to, a processing unit 120, a system memory 130, and a system bus 121 that couple various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 includes a variety of computer readable media. Computer readable media can be any available media that can be accessed by computer 110 and includes both volatile and nonvolatile media, removable and non-removable media. By way of example, and not limitation, computer readable media may include computer storage media and communication media. Computer storage media includes both volatile and nonvolatile, removable and non-removable media implemented in any method or technology for storage of information such as computer readable instructions, data structures, program modules or other data. Computer storage media includes, but not limited to, Random Access Memory (RAM), Read-Only Memory (ROM), Electrically Erasable Read-Only Memory (EEPROM), flash memory or other memory technology, Compact Disk Read-Only Optical Memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media embodies one or more of computer readable instructions, data structures, program modules, and the like, and/or other data in a modulated data signal such as a carrier wave or other transport mechanism, and may include any known information delivery media consistent with this disclosure. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

The system memory 130 includes computer storage media in the form of volatile and/or non-volatile memory such as read only memory (ROM) 131 and random access memory (RAM) 132. A basic input/output system 133 (BIOS), containing the basic routines that help to transfer information between elements within computer 110, such as during start-up, may be stored in ROM 131. RAM 132 may contain data and/or program modules that are readily accessible by a processing unit 120. By way of example, and not limitation, and as illustrated in FIG. 1, such data and/or program modules may include an operating system 134, application programs 135, other program modules 136, and program data 137.

The computer 110 may also include other removable/non-removable volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156 such as a CD ROM 156 or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 may be connected to the system bus 121 through a non-removable memory interface 140, and magnetic disk drive 151 and optical disk drive 155 may be connected to the system bus 121 by a removable memory interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Each of the storing operating system 144, the application programs 145, the other program modules 146, and the program data 147 may be the same as or different from the operating system 134, the application programs 135, the other program modules 136, and the program data 137 described hereinabove. The operating system 144, the application programs 145, the other program modules 146, and the program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices may be connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and may include one, more or all of the elements described above relative to the computer 110. The logical connections depicted in FIG. 1 include a local area network (LAN) 171 and a wide area network (WAN) 173. It is contemplated that the logical connections may include other networks. These other networks may be included in combination with the LAN 171 and WAN 173. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
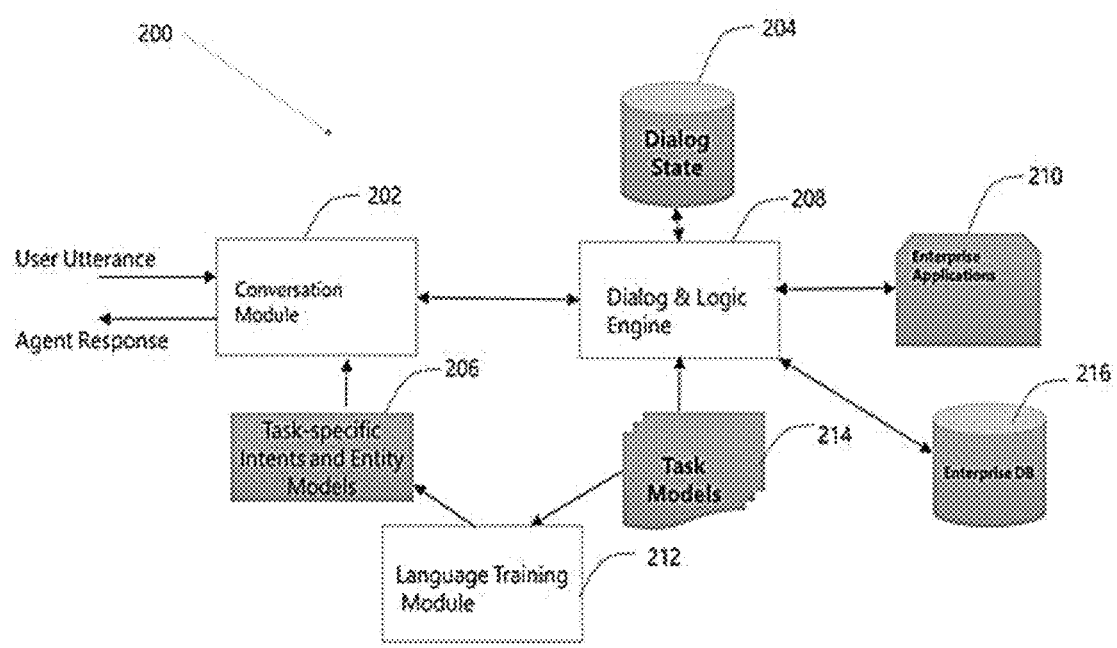
FIG. 2 is a block diagram illustrating components of a system, according to an exemplary embodiment.

FIG. 2 is a block diagram illustrating functional components of a system 200 incorporating aspects of the present disclosure. In one embodiment, the components of FIG. 2 are located within a personal computer system, such as the one illustrated in FIG. 1, although any of the computing environments described above can be used. In particular, the components can be distributed across the distributed computing environment and connected together through network connections and protocols. For example, the components could be distributed across an intranet or the Internet.

In FIG. 2, the system providing a model-based conversational agent includes a conversation module 202, a dialog and logic engine or module 208, a language training module 212, a task-specific intent and entity models 206, a task model/a task modelling language module 214, a dialog state database 204, an enterprise application 210 and an enterprise database 216.

According to an aspect, the task modelling language module or task model 214 is configured to declaratively define at least one task. In one embodiment, the task modelling language module or task model 214 is configured to declaratively define at least one task of a business process model. The task modelling language module or task model 214 is configured to enable a user such as a developer to model the task including conversational aspects of the task for virtual or intelligent agents. This model allows the task to be defined declaratively without having to specify in detail the actual flow of the dialog. In one embodiment, at least one task of the business process model is at least one of a manual task, a partially automated task, or a fully automated task.

The language training module 212 is configured to automatically generate intent identification and entity extraction patterns and rules from the virtual agent model that is described using the task modelling language module or task model 214, to train the natural language grammar. This allows the user to interact with the virtual or intelligent agent in natural language either in spoken or written form. In an embodiment, the natural language includes, but not limited to, English, French, Japanese. These generated patterns are incorporated in the language comprehension models used by the conversation module 202. This obviates the need for training the grammar from individually tagged sentences.

The conversational module 202 is configured to enable a user to interact with the system using input devices or user devices to provide input to respond to queries from the system or to otherwise provide direction. In one embodiment, the conversational module 202 is configured to receive input from the user via any format selected from a group including, but not limited to, speech or voice audio, text or video.

The dialog and logic engine 208 analyses the input from the user to access information relevant to a topic of interest. In particular, the dialog and logic engine 208 initiates or causes relevant information pertaining to the topic to be rendered to the user. Rendered information can include, but not limited to, speech or voice audio, text, maps, charts, pictures or a video sequence. In one embodiment, the rendered information could be a message or a question. The dialogue and logic engine 208 is configured to map the extracted features of the user input, such as a natural language statement with the task structure contained in the task modelling language module or task model 214, to render the right information/accurate information for the received input. The dialog and logic engine 208 along with the task modelling language module or task model 214 and the conversation module 202 is configured to check the validity of user response based on the task model.

The conversational module 202 in communication with the language training module 212 is configured to understand user intent without an explicit program. In an embodiment, the intent includes, but is not limited to, skip a question, exit or abort a process, quit the task completely, revise a user choice, find out the available choice, ask for an explanation of why some choice is not available, undo a previous step or choice, deal with ambiguous questions and inputs, ask meta questions about these built-in intents such as 'how can I revise a choice'. The pattern to express the generic intents is automatically learnt and generated by the language training module 212.

Still referring to FIG. 2, the system may further include a constraints-based logic engine (not shown) in communication with the dialogue and logic engine 208. The constraints-based logic engine is configured to maintain the full context of the order in which the user has made choices and the dependencies between those choices. This is used to allow the user to revise their choices and re-compute the consequences.

The constraints-based logic engine is further configured to map entities extracted from the user utterance or input (as received and processed by the conversation module 202) to the relevant part of the task model 214. In effect, the task model 214 acts as a natural language grammar for understanding user utterances and the dialogue and logic engine 208 and/or constraints-based logic engine acts as a parser to fit the entities derived from the user utterance into the grammar. The dialogue and logic engine 208 and/or constraints-based logic engine is further configured to apply any constraints or rules that are in the model. These constraints can be used to make logical inferences such as calculate new values or eliminate some choices, change the flow of the dialog, revise prior decisions, type or speak to the user, and take other actions that are allowed by the task modelling language module or task model 214.

The logic engine is further configured to allow many ways of grouping or nesting of models inside other models to provide reuse such as inheritance, composition, iteration, and recursion. Each model has its own entity parameters and constraints. The logic engine applies constraints within each model when it becomes active as well as constraints that span models. The logic engine is further configured to support a declarative way to define models, which allows the modeler to capture the essential entity structure and logical relations among the entity parameters without having to specify the order of execution or satisfying the constraints. This is done by following a 'data flow' mode of computation where the constraints and rules are executed only when the data is available or changes and not in a pre-specified sequence.

Figure 3:
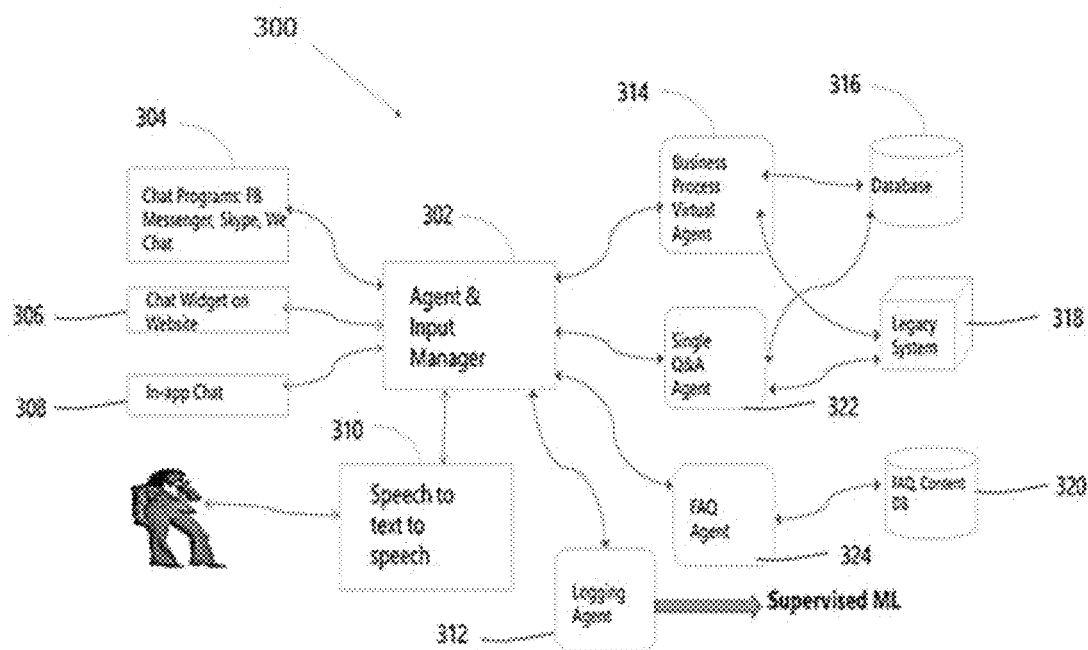
FIG. 3 is a block diagram of an agent and input manager module, according to an exemplary embodiment.

The logic engine is further configured to provide an explanation of what choices are available at any time, or why certain choices may not be available. The system further includes an agent and input manager module 302. FIG. 3 is a block diagram 300 of an agent and input manager module 302 incorporating aspects of the present disclosure.

The agent and input manager module 302 is configured to manage a plurality of conversational agents. In an embodiment, the conversational agent includes, but is not limited to, chat programs 304, chat widget on website 306, in-app chat 308, business process virtual agent 314, single Q & A agent 322, FAQ agent 324, logging agent 312 incorporated with supervised machine learning algorithm (ML). The business process virtual agent 314 and single Q & A agent 322 are in communication with a database 316 and a legacy system 318. The FAQ agent 324 is in communication with the FAQ, content database 320. In one embodiment, each input from the user is sent to the plurality of conversational agents and receives a relevant response to the user input. In one embodiment, the input is received by a speech to text and text to speech module 310. From the plurality of received response, at least one best response is rendered to the user. This allows multiple agents such as a static FAQ or clarifying questions to be managed by one agent, a second agent answering basic greetings questions from the user, and a third agent that is managing some business process such as pre-sales product selection and configuration, an automated sales process, or a post-sales support agent to be managed in a single cluster. This allows the user to request clarifying question in the middle of a business process since each question goes through the conversation module 202 and not just to a particular agent. It also allows agents to be added that could handle connections to outside sources such as search engines or content engines such as Wikipedia®.

The system further includes an input modality manager in communication with the agent and input manager module 302. The input modality manager is configured to present the response from the agent to the user in a way that is consistent with the needs of the various channels by which the user can interact with the virtual conversational agent.

These channels include, but are not limited to, text-based channels such as websites or mobile devices via a chat widget; messaging applications such as Facebook®, Messenger, Instagram®, Skype®, Slack™, or Twitter™; voice-based devices such as Amazon Alexa™, Google Assistant™, Apple Siri®; or voice-to-text API such as Google Voice™. For example, on a text-based channel such as FB® Messenger, a question posed to the User with a set of choices would be rendered using the API allowed by FB® Messenger. However, the same question on a voice channel such as Alexa® would be rendered as natural language sentence with the choices added to the question. This allows the same virtual agent to support multiple interaction modalities and channels without having to create separate virtual agents.

Figure 4:
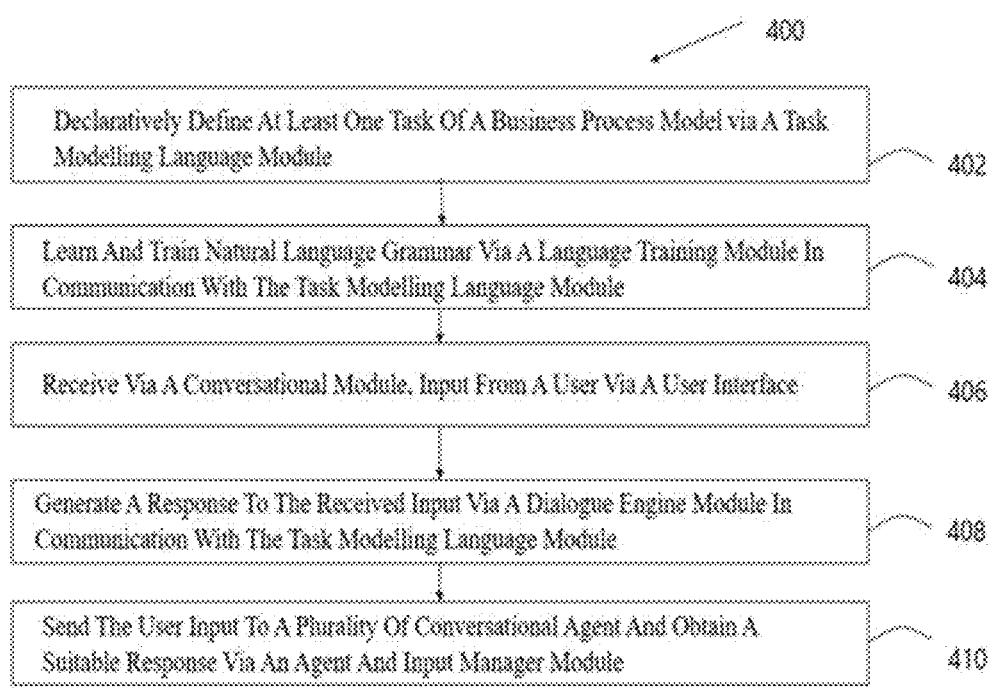
FIG. 4 is a flowchart of a method for providing a model-based intelligent conversational agent, according to an exemplary embodiment.

Referring to FIG. 4, in one embodiment, the method 400 for providing embodiments of a model-based intelligent conversational agent incorporated in a system is disclosed. The system includes a computing device comprising a processor and a memory unit, wherein the memory unit stores a set of program modules, and wherein the processor in communication with the memory unit is configured to execute the set of program modules. The method 400 includes a step 402 of: declaratively defining at the processor, via a task modelling language module, at least one task of a business process model. The method 400 further includes a step 404 of: automatically generating at the processor, via a language training module in communication with the task modelling language module, intent identification and entity extraction patterns and rules from a virtual agent model. The method 400 further includes a step 406 of: receiving at the processor, via a conversational module, input from a user via a user interface. The method 400 further includes a step 408 of: generating at the processor, via a dialogue and logic engine module in communication with the task modelling language module, a response to the received input. The method 400 further includes a step 410 of: sending at the processor, via an agent and input manager module, the user input to a plurality of conversational agents to obtain a suitable response.

In an example, a user using the conversational agent and operation of the conversational agent is disclosed.

User(U): What kinds of pizzas do you have? (Example of a FAQ type definitional question)

Agent(A): We have a cheese pizza, meat lover's pizza, veggie delight or you can create your own.

User: I want to order a large thin crust pizza with onions mushrooms and pepperoni.

Agent: Tell me the size of your pizza? Select one of: Personal, Small, Medium, or Large.

U: How many slices in a large pizza? (Instead of responding to the agent's question, the user asked their own information question)

A: A large pizza has 8 slices and feeds 3-4 people. (The agent answers the unanticipated question and then continues with its dialog, below)

A: Tell me the size of your pizza? Select one of: Personal, Small, Medium, or Large. (The agent didn't lose its context and continued with the dialog)

U: Do you have gluten free crust? (Another out-of-context Question by the user)

A: No, we don't have gluten free crust. (The agent didn't lose its context and continued with the dialog, below)

A: Tell me the size of your pizza? Select one of: Personal, Small, Medium, or Large. (The agent needs to know the size to continue)

U: Sure, I will go for Large (The user didn't just pick strictly from the offered choices but gave a more conversational answer)

A: What kind of cheese do you want on your pizza? Regular cheese, cheddar cheese, goat cheese, or No cheese?

U: cheddar. (Partial match to the choices offered)

A: Please tell me the sauce you want on your pizza? Marinara, Spicy Marinara, Garlic Parmesan, No Sauce.

U: Can I revise an earlier choice? (User is asking a meta question, i.e., a question about how to ask a question)

A: Yes, you can. Just say "change choice to new Choice". E.g., "change large to medium", or "change size to small", or "change pizza size"

U: Change the size to medium (Instead of answering the agent's question about sauce the user changed the size of the pizza)

A: No problem. I will keep everything else the same. (The agent is able to handle the revision and then continues)

A: Please tell me the sauce you want on your pizza? Marinara, Spicy Marinara, Garlic Parmesan, No Sauce.

U: Marinara and add olives to the pizza (The user answered the agent's question but also gave extra information)

A: There are two Marinara choices: Marinara, Spicy Marinara. Please say one of them. (The user input was ambiguous. The agent is asking for clarification)

U: Spicy Marinara (The agent did add the olives too after the ambiguity was resolved)

A: Would you like any additional toppings on your pizza?

U: How do I get a summary of my order so far? (Another meta Question)

A: Say "summary" to get a history of all the input and key decisions made by the bot.

A: Would you like any additional toppings on your pizza?

U: summary please

A: You made the following choices
 Pizza: Create your own
 Size: Medium
 Crust: Thin
 Sauce: Spicy Marinara
 Cheese: Cheddar Cheese
 Toppings: Onions, Mushrooms, Pepperoni, Olives A: Would you like any additional toppings on your pizza?

U: Can I remove a choice from a set of choices? (A meta Question about a more complex operation)

A: You can undo or reset a choice by saying, "undo parameter". E.g., "undo pizza size", "remove olives", "remove olives from pizza toppings"

A: Would you like any additional toppings on your pizza?

U: Remove pepperoni. (Another out of sequence user input that modifies existing order)

A: No problem. Rest of the order stays the same.

A: Would you like any additional toppings on your pizza? (The agent was distracted many times but doesn't lose its context, despite having changed the order itself during this time)

U: No

A: Thanks for your order. Do you want it delivered, will you pick it up, or eat in the restaurant?

Embodiments of the present disclosure may eliminate the need for a large set of tagged sentences for intent identification and entity extraction; may provide a natural conversation that human users are used to in their human-to-human conversations; may allow users to ask questions in response to a question or response from a virtual agent, i.e., users can interrupt the virtual agent with clarifying questions or ask for explanation; may support business logic, especially, business rules and constraints that the virtual agent needs to follow as part of its task; may maintain context and is able to change the choices made by the user and thereby change the dialog flow; and may support different modes of user interaction.

In an exemplary embodiment, the task modelling language may have one or more of the following features. Tasks that can be acted upon by the agent are described as models, where each model may be a declarative collection of parameters. These parameters may take one of the following kinds of values: symbolic, numeric (integer or floating point), or any arbitrary value including datatypes from an underlying programming language such as Python, Java, or Javascript. Symbolic or numeric parameters may be unbound or defined to be from an enumerated set (for symbolic parameters) or a range (for numeric parameters). A symbolic value may be a symbolic string or itself a model as described above, allowing models to be nested inside another. Each parameter may have additional properties that include but not limited to (a) specify how to ask the user for its value (b) what to tell the user if the user gives some incorrect value (c) whether the parameter takes a single value or a set of values or a bag of values (d) in case a parameter takes an indefinite number of values, how to end the asking loop (e) value extractors that tell the agent how to know if the user has given a value for this parameter in their natural language utterance (g) whether parameter required or optional or can be ignored when the dialog engine is trying to decide if the conversation should be continued. Model parameters may fall into at least one of the following states (though new ones may be added later): (a) can be only assigned once (logic parameter) (b) can be only assigned once and already has a value in the initial model (constant parameter) (c) can be assigned and then changed either by adding/subtracting to the numeric value or adding an element to a list value. (changeable parameter) (d) can be changed and also starts with some initial value (changeable parameter with some initial value). In case of a changeable parameter, the change may happen via an assert constraint, based on user input, or an interplay between a constraint and user input. In a case of logic parameters, they may be assigned the first time freely but then might only be changeable by backtracking to the state in a context tree (maintained by the logic engine) where the logic parameter was assigned by the user. However, logic parameters where the value was inferred by the logic engine using a constraint may not be changeable.

In an exemplary embodiment, some models may be directly given to a system via an input file, and some may be created from external data at the time the agent is started. For example, in the computer program listing BMWSelectCar_flex.txt, actual car models may be created at run-time from a table or csv file that contains data for each vehicle at the dealership. Similarly, some of the constraints may be given directly to the system and others may be created dynamically from other data when the agent starts. An example are table constraints which can be created by reading data from an external data source either via a CSV (comma separated values) file or an extract from a database system such as relational or key-value pair.

In an exemplary embodiment, the task modelling language may have a declarative way to define constraints or relationships between model parameters. These constraints may have at least one of the following forms, which are presented as exemplary and non-limiting: (a) unconditional relationships that should always hold (b) conditional or rule like constraints that have an 'if' part and only if it is true is the 'then' part acted upon. (c) table constraints that look like database tables but assert an inclusionary or exclusionary logic on the respective parameters (which are the column names of the tables) and the values in the rows which specify valid combinations to be included or excluded. The 'then' part of a constraint may be a collection of expressions built from a given set of operators and model parameters. Each expression can be either simply checked to see if it is true ('condition' expressions) or asserted to be true ('assert' expressions). In the latter case, the logic engine may make an effort to make the assert true, if possible, by propagating known values to unknown (or known but changeable) parameters via the operator in the expression.

In an exemplary embodiment, there may be a logic engine implemented in a computer environment as described with reference to FIG. 1 that may be responsible for checking and propagating values between model parameters via the constrains in the models. The logic engine may run every time the user input results in a user choice being asserted by the dialog engine. The logic engine may do the following among other actions: (a) maintains a tree of user choices (b) at each node keeps track of all the model parameters that are assigned and state of other information about them (c) finds the relevant constraints that are affected by the latest user choice and tries to make sure that each is satisfied. Constraints that simply use 'condition' expression only check to see if they are satisfied or not. But constraints that also use 'assert' expressions can via propagation derive (or infer) values for other parameters. If any constraint fails, the user choice is rejected and conveyed to the dialog module. If the result of one cycle of running through affected constraints changes the values of any model parameters, the cycle is repeated until no parameter changes a value.

In an exemplary embodiment, the language training module may process the input models and construct appropriate grammar structure about entities, their properties, n-grams for word combinations, synonym patterns, classifiers, and the relationship between the natural language expressed sentence fragment and model parameters that can hold those values, The result of the language training module is the construction of a natural language grammar that can map individual words or sentence fragments into best values for the most relevant model parameters.

In an exemplary embodiment, the logic engine may maintain a context tree rooted in the initial state where the user has not yet supplied any input. Each distinct entity or choice made by a user may create a branch in the context tree. The logic engine may move up and down this context tree to extend or switch the context of the conversation with the user. The dialog engine may receive the result of the conversation module processing the user input from the user to extract the intent and entities that are relevant. These entities are ultimately mapped to one or more model parameters when they are sent to the dialog engine. The dialog engine may talk to the logic engine to pass it new parameter-value assignments and obtain a result from the logic engine if that assignment was valid. Every input from the user may be capable of creating zero or more changes to the context tree. The dialog engine may also keep track of where it is in the context tree. Every node in the context tree may be associated with an input from the user and tied to some model parameter. Model parameters that have values associated with them are considered as 'closed' (though some of them can be reopened later). Others are considered as 'open', i.e., ones that need input from the user to close them. The dialog engine may work with the conversation module to ask the user for input that will potentially close the next open node. The conversation proceeds by the interaction between the dialog engine trying to close the open nodes and the user input leading to more nodes being potentially opened. The conversation can end when there are no more open nodes in the context tree and the user has no more input to volunteer.

In an exemplary embodiment, an input manager may be connected to multiple agents each with its own conversation module and each capable of processing the user input independently. The input manager may send the user input to all the agents and select the best response to the user. The agents in such cases may be configured to rank their responses on a common scale so that they can be compared to determine the best response. Alternatively, the input manager may have a ranked hierarchy of agents from best to worst and it may try the agents in order until one returns an acceptable response. The criterion for acceptability may be global or set by each agent for itself. Alternatively, the input manager may have a ranked hierarchy of agents where the ranking is either given ahead of time, or the input manager can adaptively learn a best order based on how the user reacts to the response. If an agent's response generates a negative reaction from the user, then the agent may be downgraded in the order hierarchy.

In an exemplary embodiment, the user device may be a microphone and speaker combination. The user may talk into the microphone, have the sound data converted into text via a speech-to-text converter, and then text may then be passed to the conversation module. The conversation module may work with the system to obtain the appropriate text output, and then a text-to-speech converter may be used to convert the text to speech and send it to the speaker of the user device.

In an exemplary embodiment, the conversation module may be capable of the following when it is presented an input text from the user. In a case where the system had asked a question from the user, the system may treat the user input as being one of the following and then respond appropriately:
   a) User input was a valid answer to the question. In this case, the dialog engine decides the next question to ask or next input to be sent to the user.

b) The user input was not a valid answer to the answer and could not be interpreted to be relevant to any of the intents and entities known to the model. In such cases, the dialog engine rejects the input with appropriate reason. It then asks the user to answer the question again.
c) The user input contains an answer to the question and additional information that can be interpreted using the model. In such cases, the initial question is treated as answered and the additional information is processed to create additional streams of action by the dialog engine.
d) The user input does not answer the question but has text that can be interpreted based on the intents and entities known to the model. In such cases, the question will be repeated to the user, but the additional information will create additional streams of action by the dialog engine.

In cases (c) and (d), the new entities may lead to new lines of conversation for the dialog engine and it will see each line of inquiry to its logical conclusion.

In an exemplary embodiment, the conversation module may have a number of predetermined intents that it has been trained in without needing to be contained in the model that used to train it for a specific task. These predetermined intents may include, but are not limited to, the following:
a) Ask for the value of a specific entity whether it was entered by the user or obtained from the model. The conversation context stays where it was.
b) Find out if the value of an entity was given by the user or decided by the logic engine working on the model. The conversation context stays where it was.
c) When the value of an entity was derived by the logic engine, ask under what set of inputs was the logical inference made. The conversation context stays where it was.
d) Ask to change or revise or undo a choice made by the user. In such cases, the conversation context changes to the state resulting from change or undoing the user choice
e) Skip answering a question. The context changes to the next question in the original context.
f) Quit the current session. The context changes to the end of the conversation.
g) Restart the current session. The context changes to the beginning of the conversation as defined by the model.

In an exemplary embodiment, a model translator may work on food menus as contained in point-of-sale systems of digital ordering platforms via an application programming interface (API) defined by those systems. The model translator may read the menu structure data such as menu category, menu item, modifier group, and modifier item and automatically create the models comprising model parameters and constraints. These models may then be used to create a conversational food ordering agent. In an exemplary embodiment, the menu data obtained from the third-party systems may include upsell and cross-sell data such as combo items, associated items, etc. This data may also be converted by the model translator into model data that may be used by the conversational agent to not only create and validate orders but to also do up-selling and cross-selling of products and services.

Figure 5:
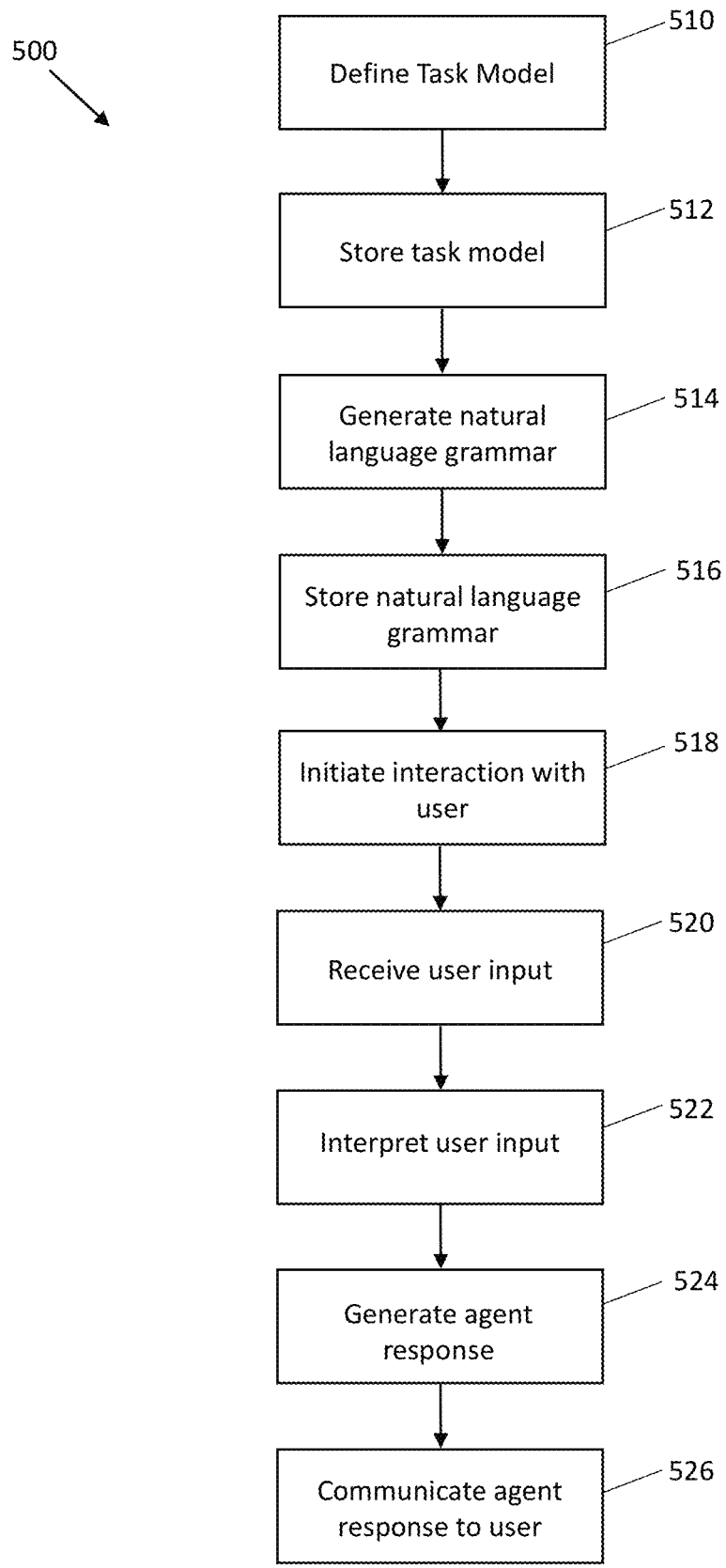
FIG. 5 is a flowchart of a method for providing a model-based intelligent conversational agent, according to an exemplary embodiment.

FIG. 5 shows an exemplary embodiment of a method 500 for providing an artificial intelligence conversational agent for interacting with a user. In block 510, a task model is declaratively defined using a task modelling language. The task model may include one or more parameters, as well as a description of acceptable values for each parameter. The task model may be written in a task modelling language such as yaml. However, it will be understood that yaml is not the only task modelling language, and that any task modelling languages may be used as long it allows for declarative definition of the task model. In this context, "declarative" generally means that the task is defined in terms of what parameters need to be filled and does not require a specific order of steps. Each parameter in the task model may include several types of information. For example, the parameter may include a current value for the parameter, a domain of acceptable values for the parameter, an indication whether the parameter is required or optional, a default value for the parameter, or an indication whether the parameter can be modified by the user. It will be understood that this list of information provided in a parameter is intended to be exemplary and not limiting. The task model may also include constraints on values assigned to the parameters. The .txt files attached to the present application and incorporated by reference show various exemplary embodiments of task models, parameters, and constraints.

Figure 6:
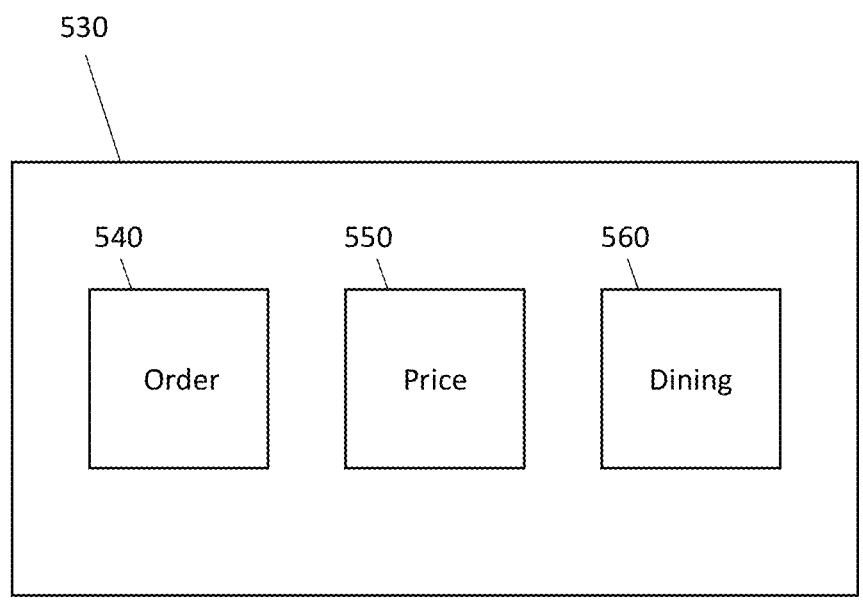
FIG. 6 is a schematic block diagram of a task model, according to an exemplary embodiment.

FIG. 6 shows a schematic block diagram illustrating an exemplary embodiment of a basic task model 530 for placing an order from a restaurant. The task model 530 may include a first parameter 540 describing the contents of the order, a second parameter 550 describing the price of the order, and a third parameter 560 describing the dining status of the order such as dine-in, takeout, or delivery. It will be understood that in actual practice, the task model 530 may include different and/or additional parameters than the first parameter 540, the second parameter 550, and the third parameter 560 shown in FIG. 6, and that a limited number of parameters are discussed here for illustrative purposes only. Individual parameters may be a required parameter or an optional parameter. A required parameter is one that must have a value in order to complete the task model. For example, the first parameter 530 may be a required parameter, as it would not be possible to complete an order from a restaurant without specifying the contents of the order. Parameter may further have a default value that may or may not be changed by the user. For example, the third parameter 560 may default to a status of "Takeout," unless modified by the user. Additionally, some parameters may be fixed depending on the value of other parameters and are not modifiable by the user. For example, the second parameter 550 may be dependent on the values assigned to the first parameter 540. Further explanation regarding parameters will be described herein.

Returning to FIG. 5, in block 512, the task model 530 may be stored in a computer-readable storage medium. The computer-readable storage medium may be any type of storage medium as discussed herein with reference to FIG. 1. In block 514, a natural language grammar may be generated based on the task model 530. The natural language grammar may be developed through machine learning to generate a set of tools, algorithms, and/or rules that may be used to parse a user input and identify entities relevant and/or acceptable to the various parameters of the task model 530. In other words, generation of the natural language grammar may use Natural Language Processing tools such as stemming, lemmatization, N-grams, relative positioning of words, and other tools to generate the natural language grammar used by the chat agent. Using the task model 530 of FIG. 6, the natural language grammar may be configured to identify and extract entities and intents from the user input. For example, if a user input stated "I want to order a pizza," the natural language grammar may be configured to parse this input and identify "pizza" as an entity that is an acceptable value for the first parameter 540 of the task model 530. In block, 516, the natural language grammar may be stored in a computer-readable storage medium. This may be the same computer-readable storage medium as that which the task model 530 is stored in, or it may be in a different computer-readable storage medium.

In block 518 of FIG. 5, the agent's interaction with the user is initiated. This may be accomplished in a variety of ways. In an exemplary embodiment, the interaction may be initiated by the user sending a text message to a predefined contact corresponding to the conversational agent. Alternatively, the user may issue a voice command to a mobile phone, tablet, computer, ordering kiosk, or the like to initiate the interaction. Alternatively, the user may use a touch screen to initiate an interaction. Alternatively, a conversational agent may automatically detect a presence of a user and initiate the interaction. For example, if a user approaches an ordering kiosk at a restaurant, optical sensors, audio sensors, or haptic sensors such as weight sensors may detect a user's presence, an interaction may be initiated with a welcome message.

In block 520, the user's input is received via any one of the interfaces described herein with reference to FIG. 1. For example, the user may enter a text input via a keyboard, the user may enter a voice input through a microphone, the user may enter an input via a pointing device such a mouse or trackball, or the user may touch a touch-enabled display. Alternatively, a combination of user inputs may be used.

In block 522, the user input may be interpreted with a processor using the previously stored task model 530 and the natural language grammar. In other words, the user input is interpreted with the processor based on the task model (such as the task model 530) and the natural language grammar. The processor may be any suitable type of processing device, such as any processor as described herein with reference to FIG. 1. Interpreting the user input may include parsing the input and identifying entities and/or intents using the natural language grammar, determining whether any entities in the user input are acceptable values for a parameter, assigning values to parameters, evaluating various logic rules and/or constraints in view of the user input, or determining whether the user input opens any new task models and/or parameters. Further explanation and exemplary embodiments regarding the interpretation of the user input will be described herein.

In block 524, an agent response may be generated. In an exemplary embodiment, the agent response may be an acknowledgement of the user input, a prompt for further input, a response to a user question, or an explanation of why a particular input was invalid. In block 526, the agent response may be communicated to the user, such as via a display on a monitor, via speakers, or a combination of outputs.

Figure 7:
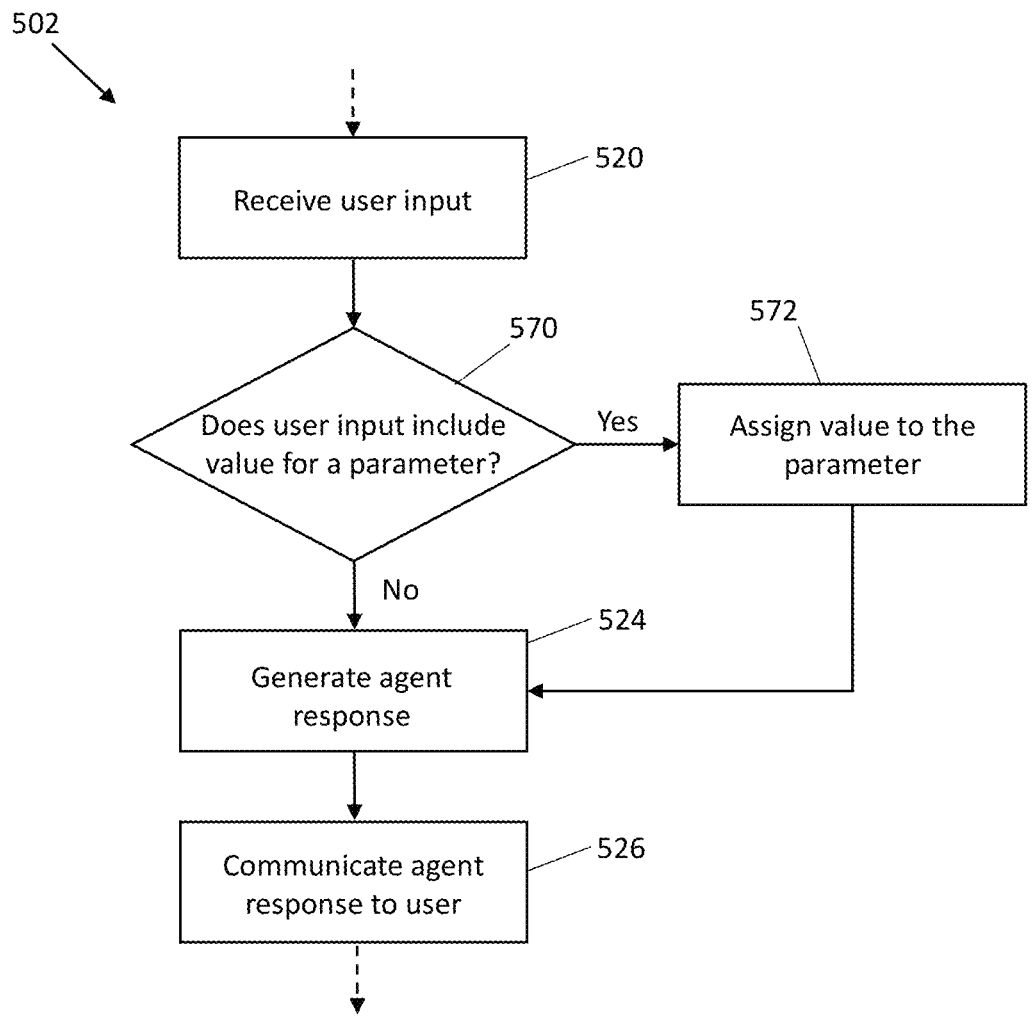
FIG. 7 is a flowchart of a method for providing a model-based intelligent conversational agent, according to an exemplary embodiment.

FIG. 7 shows an exemplary embodiment of a method 502 with one possible example of interpreting the user input. For ease of illustration, the method 502 starts with the block 520 regarding receiving the user input. In block 570, it is determined whether the user input includes a value that is acceptable into one of the open parameters of the task model. For example, the natural language grammar may be used to parse the user input to identify entities and compare them to acceptable values for open parameters. In other words, the method 502 may include determining whether the user input includes a user-defined parameter value to be assigned to a parameter. Using the task model 530 as one possible example, the open parameters may be the first parameter 530, the second parameter 540, and the third parameter 550. In a hypothetical interaction, the user may input a statement such as "I would like a pizza." In an exemplary embodiment, the processor, using the natural language grammar, may analyze and parse the input from left to right, and may determine that the words "I," "would," "like," and "a" are not acceptable inputs to any of the open parameters. However, the processor may identify "pizza" as an acceptable value for the first parameter 530 in the block 570. Accordingly, the method may proceed to block 572, i.e., following the "yes" branch at block 570. In block 572, the value "pizza" is assigned to the first parameter 530. The method then proceeds to block 524, where the agent may generate an agent response such a confirmation that the user is ordering a pizza, or a prompt for further open parameters. In other words, in response to a determination that the user input includes the user-defined parameter value, the user-defined parameter value is assigned to the required parameter.

On the other hand, consider a situation where the user incorrectly initiated an interaction with a restaurant conversational agent and inputs a statement such as "I want to buy flowers." In this situation, the processor, using the natural language grammar, may determine that none of the words in the user input are an acceptable input for any of the open parameters. Accordingly, the method may proceed from the block 570 to the block 524, i.e., following the "no" branch at block 570. In the block 524, the agent may generate an agent response explaining that the user's input does not appear to be relevant to placing an order at the restaurant, and then prompt for further input, such as querying whether the user would like to place an order for food or drink. In other words, in response to a determination that the user input does not include the user-defined parameter value, an explanation of why the user input is not relevant to the required parameter is generated, and/or a prompt to enter the user-defined parameter value may be entered.

Figure 8:
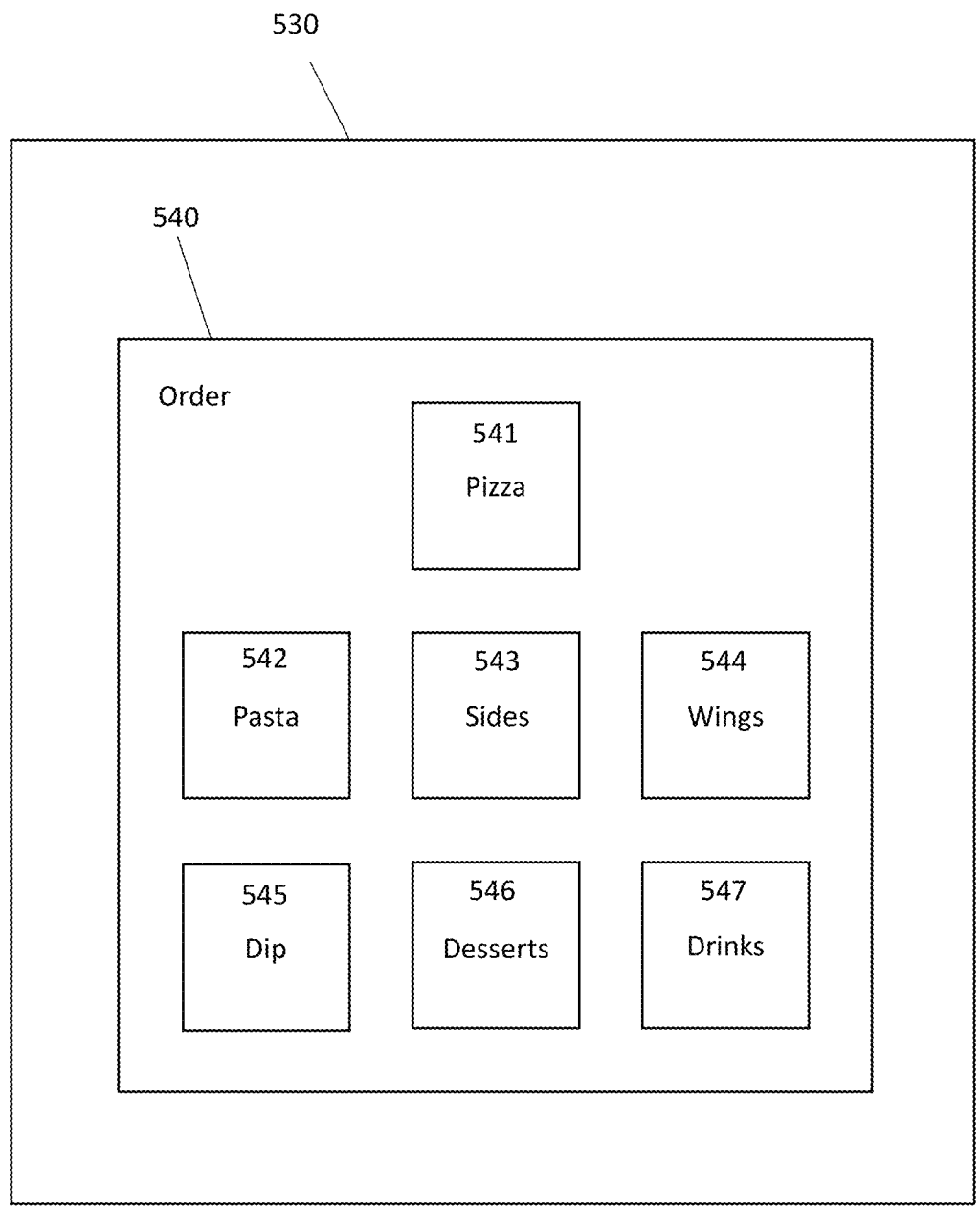
FIG. 8 is a schematic block diagram of a task model, according to an exemplary embodiment.
Figure 9:
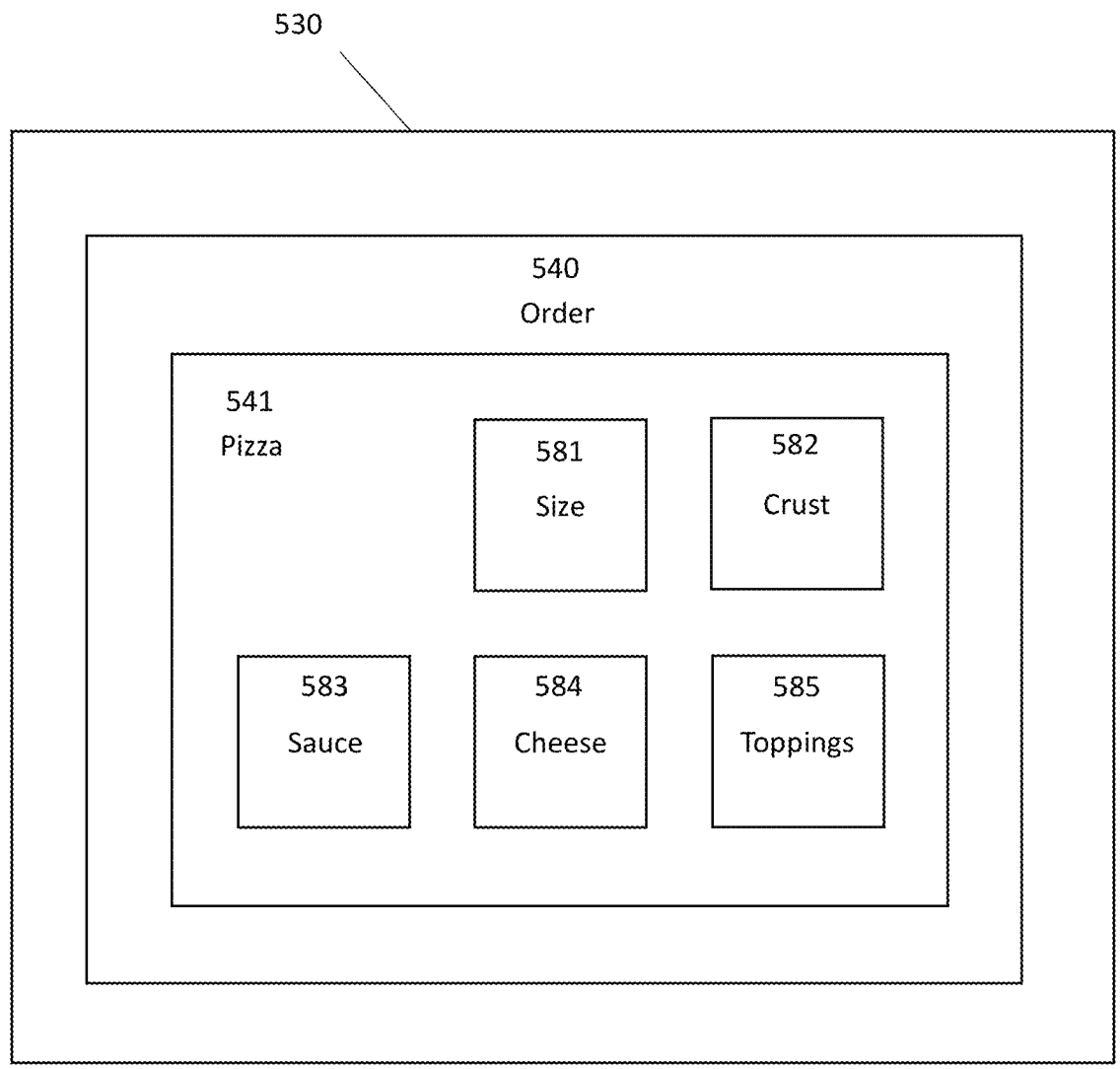
FIG. 9 is a schematic block diagram of a task model, according to an exemplary embodiment.

In an exemplary embodiment, an acceptable value for a parameter may itself be another task model having its own set of parameters. In other words, task models may be nested within each other. For example, FIG. 8 shows an exemplary embodiment in which the first parameter 530 describing the contents of the order is actually a task model including a pizza parameter 541, a pasta parameter 542, a sides parameter 543, a wings parameter 544, a dip parameter 545, a desserts parameter 546, and a drinks parameter 547. In an exemplary embodiment, one or more of the pizza parameter 541, the sides parameter 543, the wings parameter 544, the dip parameter 545, the desserts parameter 547, and the drinks parameter 547 may themselves be declaratively defined task models with their own parameters. For example, FIG. 9 shows an exemplary embodiment of possible parameters within the pizza model/parameter 541, which may include a size parameter 581, a crust parameter 582, a sauce parameter 583, a cheese parameter 584, and a toppings parameter 585. In other words, a higher-level task model (i.e., a primary task model) may include at least one parameter that is itself a lower-level task model (i.e., a secondary task model). In other words, an object in the task model may simultaneously be both a parameter and a model.

In view of this concept of nested models illustrated in FIG. 6, FIG. 8, and FIG. 9, it will be understood that a list of open parameters requiring assignment of a value to complete a task may be dynamic and change in response to user inputs. For example, based on FIG. 6, an initial list of open parameters may include the following:

the first parameter 540 (Order)
the third parameter 560 (Dining)

It will be understood that the second parameter 550 (Price) may be wholly dependent on the first parameter 540 and the third parameter 560, and thus may not be an open parameter and may not require user input.

However, upon determining through user input that the user would like to order a pizza, the list of open parameters may be modified and may include the following:
- the first parameter 540 (Order)
  - the pizza parameter 541
    - the size parameter 581
    - the crust parameter 582
    - the sauce parameter 583
    - the cheese parameter 584
    - the toppings parameter 585
- the third parameter 560 (Dining)

It will be understood that, in an exemplary embodiment, it may not be necessary for a higher-level parameter to be explicitly assigned a value from user input before opening additional lower-level parameters. Instead, the task model and the natural language grammar may be configured so as to assume a value for a higher-level parameter if sufficient information from lower-level parameters is provided. For example, in a first instance, the user may give an input of "I would like to order a pizza." This may trigger the agent to open all parameters that are part of the pizza model/parameter 541.

On the other hand, the user may give an input of "I want to order a large pepperoni." While the user input does not specify a pizza per se, the natural language grammar may extract the entities "large" and "pepperoni," and determine in conjunction with the definitions in the various task models that the only logical conclusion is that the user would like to order a pizza, as the entities "large" and "pepperoni" only exist as acceptable values for parameters within the pizza model/parameter 541. In contrast, if the user merely gave an input of "I would like a large," the agent would be unable to determine whether additional parameters should be opened, as the "large" entity may be an acceptable value for parameters within a number of different models, such as the pizza model/parameter 541, the pasta model/parameter 542, or the drinks model/parameter 547. Accordingly, in this situation, the agent may prompt the user for additional clarifying information.

In an additional exemplary interaction between the user and the agent, the user may input a statement such as "I want a large pepperoni and a small Pepsi." On a top level, with reference to the task model 530 and parameters shown in FIG. 6, entities such as "large," "pepperoni," "small," and "Pespi" may not be valid inputs for the first parameter 540 or the third parameter 560. However, the agent may be configured to compare these extracted entities to the domains of accepted values for models and parameters nested within the first parameter 540. In this case, the agent may recognize that "pepperoni" corresponds to an acceptable value for the toppings parameter 585 within the pizza model/parameter 541, and that the "Pepsi" corresponds to an acceptable value within the drinks model/parameter 547. Additionally, based on using the natural language grammar to interpret the user input, the agent may determine that the entity "large" is associated with "pepperoni" by virtue of the word proximity and that the word "large" immediately precedes "pepperoni." Accordingly, the entity "large" may be assigned as a value within the size parameter 581 within the pizza model/parameter 541. Similarly, the entity "small" may be assigned to a size parameter (not illustrated) within the drinks model/parameter 547.

Figure 10:
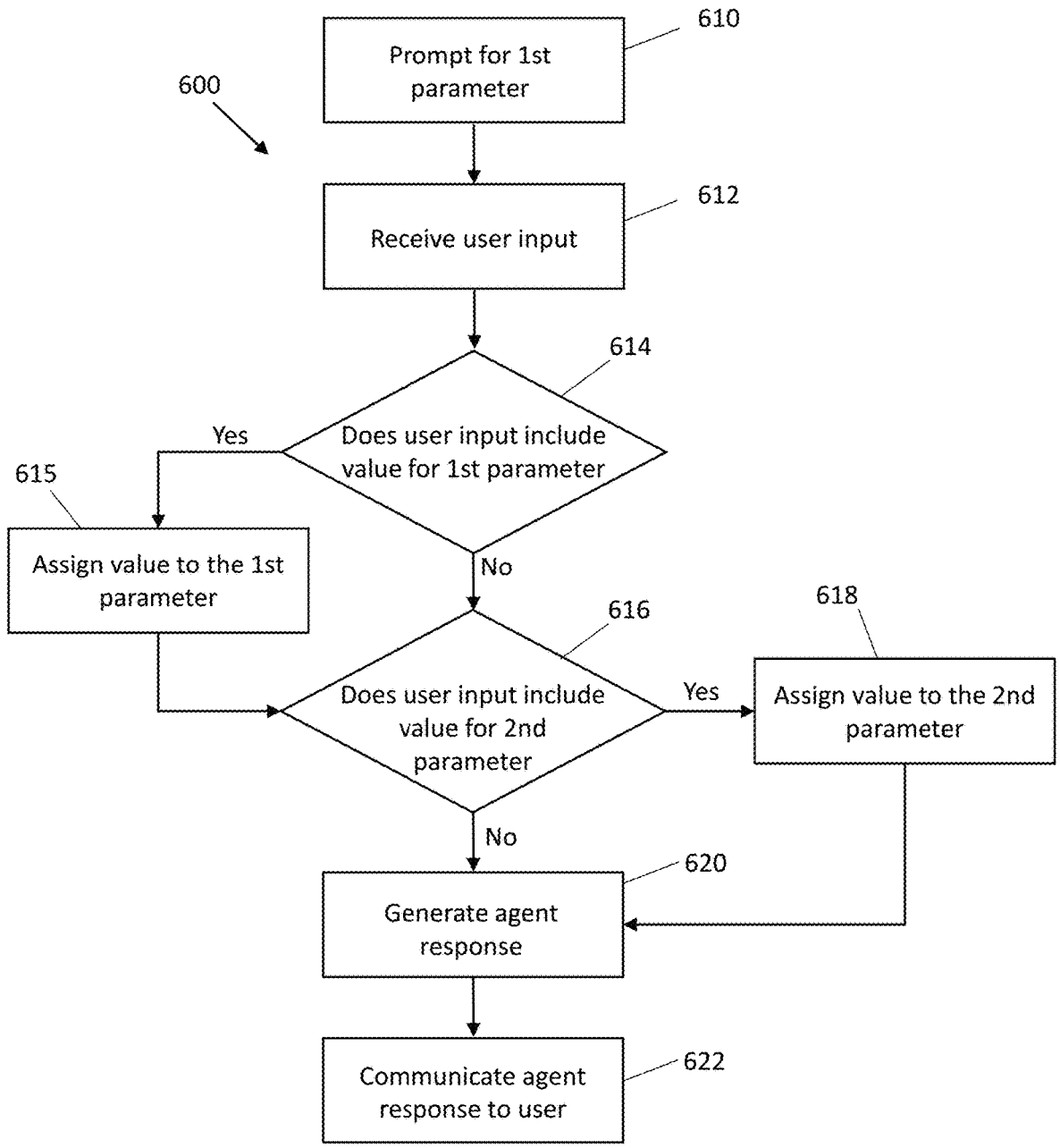
FIG. 10 is a flowchart of a method for providing a model-based intelligent conversational agent, according to an exemplary embodiment.

Overall, because the task models are declaratively defined, it is not required to assign values to parameters in any predefined order, even if the agent is sending a prompt for a specific parameter. For example, FIG. 10 shows an exemplary embodiment of a method 600 that shows the flexibility of using declaratively defined models. For example, assuming that the user is in the process of interacting with an agent to order a pizza, there may be a plurality of open parameters that require values. In block 610, the agent may prompt a user to provide a value to be assigned to a first parameter of the plurality of parameters. For example, based on the task model, the agent may be prompted to ask, "What size pizza would you like?" In this case, the agent is asking the user to provide a value for a size parameter (for example, the size parameter 581 in FIG. 9). The user response is received in block 612.

In block 614, the agent determines whether the user input includes a value for the first parameter. For example, the user input may include "I would like a large." In this case, the agent would use the natural language grammar to extract the entity "large" and recognize that this is responsive to the prompt, as "large" is an acceptable value for a size parameter. It should be noted that although "large" may be an acceptable value for many parameters (pizza size, drink size, pasta size, etc.), in this context, the agent may assume that the user input includes a valuable assignable to the pizza size parameter, as the user input is directly in response to a prompt about pizza size. As a contrasting example, if the user input included "I would like a large Coke," the natural language grammar may place a higher priority on the proximity of the entities "large" and "Coke" and conclude that the user is describing a drink order, and not responding to the prompt about pizza size. Overall, if it is determined that the user input includes a user-defined parameter assignable to the first parameter ("yes" in block 614), then the method proceeds to block 615, where the value is assigned to the first parameter. On the other hand, if it is determined that the user input does not include a user-defined parameter assignable to the first parameter ("no" in block 614), then the method proceeds to block 616. It will also be noted that the method may also proceed from block 615 to block 616, to account for situations in which the user input includes values assignable to a second parameter in addition to the first parameter.

In block 616, it is determined whether the user input includes a value that is assignable to a second parameter. If it is determined that the user input includes a value assignable to the second parameter ("yes" in block 616), then the method proceeds to block 618, where the value is assigned to the second parameter. On the other hand, if it is determined that the user input does not include a value assignable to the second parameter, then the method proceeds to block 620. In an exemplary example, the user input in response to the prompt may include "I would like a large pizza and a Pepsi." In this situation, in block 614, it would be determined that the input includes a value assignable to the first parameter (i.e., the "large" entity associated with "pizza"). Accordingly, the method would proceed to block 615, assign "large" to the pizza size parameter, and then proceed to block 616. In block 616, it would be determined that "Pepsi" may be assignable to a drink type parameter. Accordingly, the method would proceed to block 618 where "Pepsi" is assigned to the drink type parameter. The method then proceeds to block 620 to generate an agent response. To generate the agent response, the task model may be evaluated to determine what parameters still require assignment of values, and constraints may be evaluated against values to ensure that all parameter values are still acceptable. For example, based on the task model, it may be determined that a pizza topping parameter still needs to be addressed. Further, the assignment of "Pepsi" to a drink type parameter may open a parameter for drink size that must not be filled. Based on the configuration of the task model, the agent response may be crafted to prompt the user for a value of one of the remaining open parameters. In block 622, this response may be communicated to the user.

In an alternative exemplary situation, in response to an agent prompt for a pizza size, the user may reply "I'd like to add pepperoni to my pizza." In this situation, in block 614, it would be determined that the input does not include any entities assignable to the first parameter (i.e., pizza size). Accordingly, the method may proceed along the "no" branch to block 616. In block 616, it may be determined that the entity "pepperoni" is an acceptable value for a pizza toppings parameter. Thus, the method would proceed to block 618 where "pepperoni" would be assigned to the pizza toppings parameter. The method would then proceed to block 620 to generate an agent response. In this situation, the task model may be configured such that the agent acknowledges the value for the second parameter, but the task model would still have the first parameter requiring a value, and thus prompt again for the first parameter. Thus, an exemplary agent response may be "I have added pepperoni as a topping. What size pizza would you like?" In this way, the agent is flexible enough to assign unexpected values to relevant parameters while maintaining its place in the task model.

In an exemplary embodiment, the task model, parameters, and/or models within the task model may be generated based on an external data file. For example, one common task that may be described in a task model is the sale of a product or service, such as the examples given above in the context of a pizza order. In this context, many businesses may have similar files defining the different models and parameters involved in ordering a product or service from that business. For example, if a top-level task model for a conversational agent is generated, an application or program can be used in conjunction with an application programming interface (API) defined by a digital ordering platform for the product or service to generate additional models and parameters within the task model. For example, in the context of a restaurant having an online ordering platform on the restaurant's website, an application may be able to analyze the online ordering platform to determine models and parameters such as what items are for sale, how much do they cost, what options are available, etc., and structure this information into a declaratively defined task model. Alternatively, a domain of acceptable values for a parameter may be constantly changing depending on items in stock. For example, in the context of an auto dealership, the specific vehicles in stock may change on a periodic basis, which could change the domain of acceptable values for parameters related to the vehicles. Accordingly, the agent may be configured to access an external data file such as a comma separated values (CSV) file maintained and updated by the business to extract parameter domains based on what vehicles are in stock. The file "bmwbodytop_csv.txt" appended to this disclosure and incorporated by reference, is one possible exemplary embodiment of an external csv file that may be accessed in order to complete a task model.

If the user input does not include any values assignable to any parameters (i.e., "no" in both block 614 and block 616), the agent response in block 620 may provide an explanation to the user and re-prompt for the first parameter. An exemplary agent response in this situation may be "I apologize, but your reply does not appear to be relevant to your order. What size pizza would you like?"

In the description above, reference is made to a first parameter and a second parameter. However, it would be understood that this description merely serves to identify specific parameters from among a plurality of parameters and does not imply and specific order or precedence among the parameters. To the contrary, in the declaratively defined task models of the present application, the order of the parameters is not important.

The method 600 shown in FIG. 10 may also accommodate situations where the user unexpectedly modifies a value previously assigned to a parameter. For example, it may be assumed that in the course of an interaction, a user has specified that they want to order a large pizza. At some point in interaction (i.e., block 610), the agent may prompt the user to provide a value for a first parameter such as pizza toppings parameter. An exemplary prompt may be "Please tell what pizza toppings you would like." In block 612, the user may reply with a user input such as "You know, I want a small pizza instead." In block 614, it would be determined that none of the entities in the user input are relevant to the pizza toppings parameter, based on a domain of acceptable values included in the task model. Accordingly, the method would proceed along the "no" branch from block 614. In block 616, it may be determined, using the task model and the natural language grammar, that the entities "small" and "pizza" refer to a second parameter, i.e., the pizza size parameter that was previously set. Accordingly, the method may proceed along the "yes" branch from block 616 to block 618, where the pizza size parameter is modified to the value "small." Next, in block 620, an agent response may be generated that confirms the modification to the second parameter, and then prompt again for the first parameter. An exemplary agent response may be "I have changed your pizza size to small. What toppings would you like on your pizza?" It will be noted that the agent is able to accommodate the unexpected parameter modification and still return to a logical place in the task model to continue the interaction.

Figure 11:
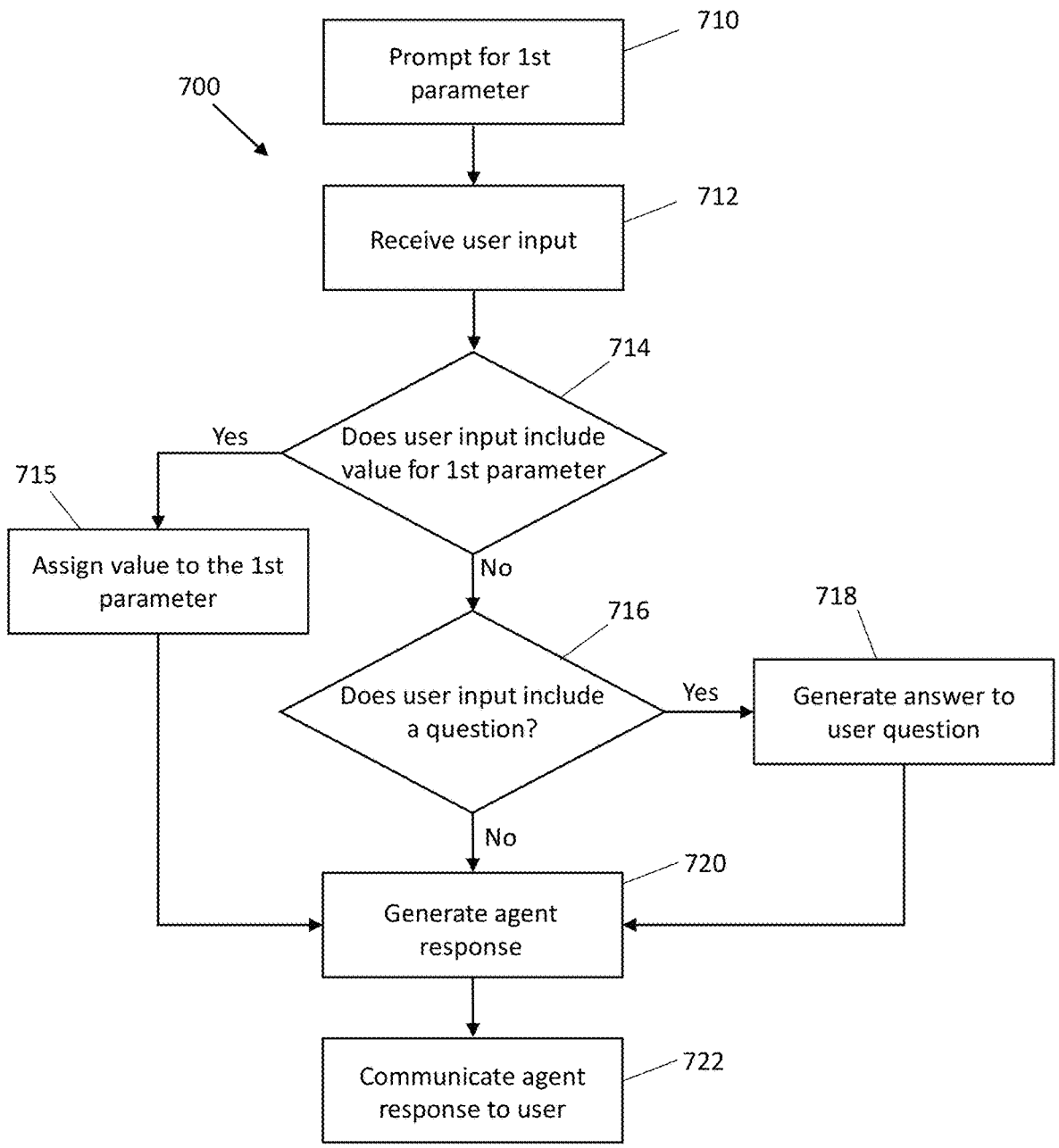
FIG. 11 is a flowchart of a method for providing a model-based intelligent conversational agent, according to an exemplary embodiment.

Sometimes a user may have questions during the interaction with an agent. Such questions may not have any values to assign to a parameter. The natural language grammar may be used to interpret user inputs to recognize when a question is being asked. FIG. 11 shows an exemplary embodiment of a method 700 for recognizing and interpreting a user question. For example, in block 710, the agent may prompt for a value to be assigned to a first parameter. An exemplary prompt may be "What size pizza would you like to order?" In block 712, the user provides an input, and in block 714, it is determined whether the input includes a value for the first parameter. If the user input includes a value for the first parameter ("yes" in block 714), then the method proceeds to block 715 where the value is assigned to the first parameter, and then to block 720 where an agent response is generated and then communicated to the user in block 722.

On the other hand, the user input from block 712 may not include a value assignable to the first parameter. For example, the user may reply with a question such as "What pizza toppings are available?" or "Can I add a drink to my order?" In this situation, the method may follow the "no" branch from block 714. In block 716, the natural language grammar may be used to identify whether the user has asked a question. For example, the word "what" may be indicative of a question. Additionally, if the user input is text-based, the inclusion of a question mark may indicate a question. Additionally, if the user input is voice based, the agent may use voice intonation to determine whether a question is being asked. If it has been determined that the user is asking a question ("yes" in block 716), the method proceeds to block 718. In block 718, the agent may generate a context-appropriate answer to the user question. For example, if the user asks, "What pizza toppings are available?", the agent may interpret the task model and provide a list of the domain of acceptable values for the pizza topping parameters. Alternatively, if the user asks a meta question such as "How do I add a drink to my order?" the agent may generate a response with certain commands or key words used to add a value to the drink parameter of the task model. The method would then proceed to block 720 where an agent response is generated. The agent response may include the answer to the user question and may also include a re-prompt for the first parameter. For example, an exemplary agent response may be "You can have pepperoni, peppers, onions, mushrooms, and/or sausage as pizza toppings. What size pizza would you like?" or "To add a drink, please say 'add a drink' or simply state the size and type of the drink you would like. What size pizza would you like?" It will be noted that the agent is able to accommodate the unexpected question and still return to a logical place in the task model to continue the interaction.

Figure 12:
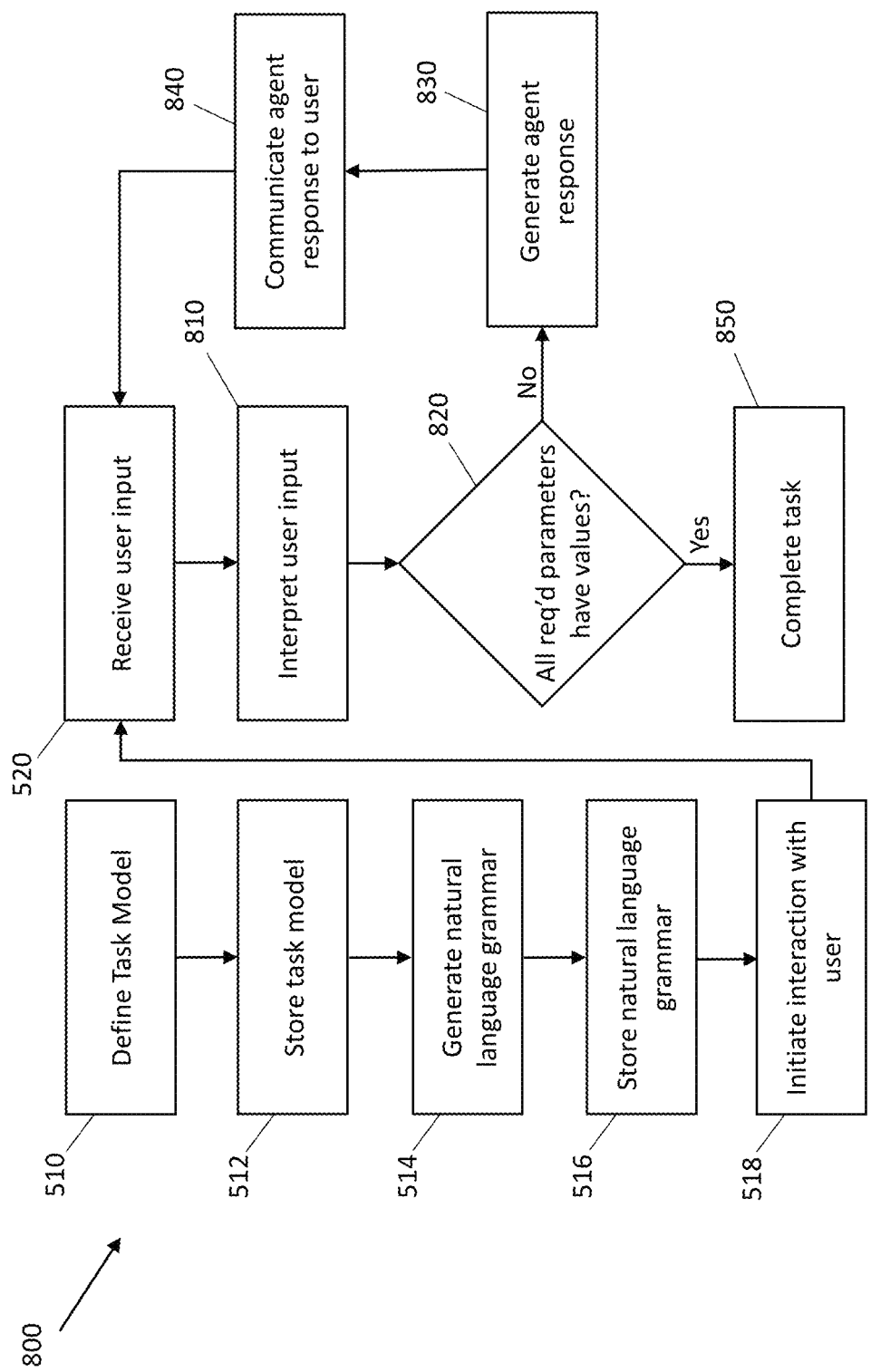
FIG. 12 is a flowchart of a method for providing a model-based intelligent conversational agent, according to an exemplary embodiment.

As may be understood from the above, the list of open parameters may dynamically change, an unexpected modifications and/or user questions may occur. Overall, an exemplary embodiment of the method may iteratively operate until all open parameters necessary for the task model have been assigned a value. FIG. 12 shows an exemplary embodiment of a method 800 for iteratively completing a task defined in a task model. In FIG. 12, block 510, block 512, block 514, block 516, block 518, and block 520 may be identical to the same blocks as described above with reference to FIG. 5, and discussion of these blocks will be omitted here. In block 810, the user input may be interpreted similar to any of the examples provided above, such as assigning values to parameters, identifying unexpected parameter values and assigning them to parameters, identifying user questions, identifying modifications to previously set parameters, identifying that no parameter values have been provided, or any other interpretation as may be defined in the task model. As part of block 810, the method may also update its list of open parameters in view of user input and apply constraints to parameter values to insure they are still valid. In block 820, it may be determined whether all of the open/required parameters have valid values. If not, (i.e., "no" in block 820), the method proceeds to block 830, where an agent response is generated. The agent response may acknowledge previous user inputs, answer questions, or prompt for a next open parameter. In block 840, the agent response may be communicated to the user. The method then returns to block 520 were additional user input is received. Once all open parameters have valid values (i.e., "yes" in block 820), the method may proceed to block 850 where the task is completed.

As discussed above, the task model may include one or more constraints on the values that may be accepted in a parameter, or one values that may simultaneously be accepted in two or more parameters. For example, in an exemplary embodiment, a task model for ordering pizza may include a parameter for number of toppings and a parameter for size. There may also be a constraint in the task model that the number of toppings is capped at three when the pizza size is small. Accordingly, if the user attempts to add a fourth topping to a small size pizza, or modify a size to small when there are four or more toppings on the pizza, when the constraint is applied to the values, the agent may generate an agent response explaining the conflict and/or requesting a modification to one or more parameter values in order to satisfy the constraint.

Figure 13:
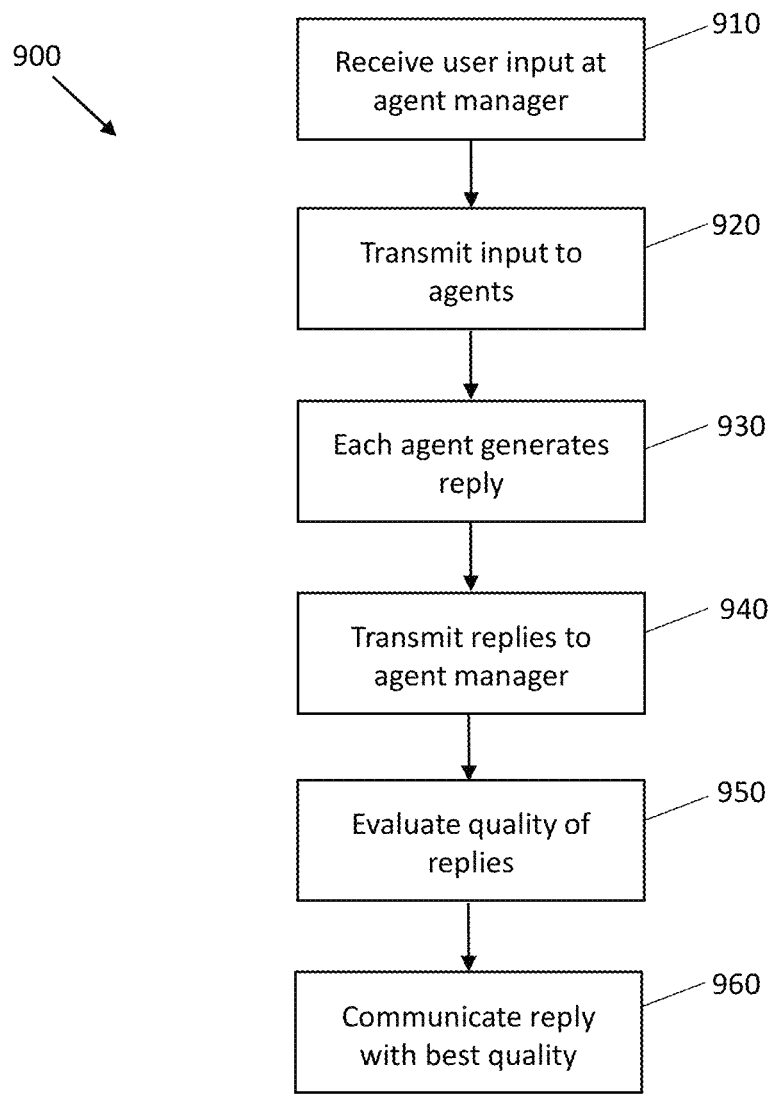
FIG. 13 is a flowchart of a method for providing a model-based intelligent conversational agent, according to an exemplary embodiment.

In an exemplary embodiment, a plurality of conversational agents may be used to generate a response to a user input. FIG. 13 shows an exemplary embodiment of a method 900 for generating an agent response using a plurality of agents. In block 910, a user input may be received at an agent manager, such as the input manager module 302 shown in FIG. 3. The agent manager 302 may be implemented in any suitable computer environment, such as any of the computer environments described with reference to FIG. 1. In block 920, the input may be transmitted to a plurality of agents, including, but not limited to the business process virtual agent 314, the single Q&A agent 322, the FAQ agent 324, and/or the logging agent 312 shown in FIG. 3. The business process virtual agent 314, the single Q&A agent 322, the FAQ agent 324, and the logging agent 312 may be implemented in any suitable computer environment, such as any of the computer environments described with reference to FIG. 1. In block 930, each agent of the plurality of agents generates a reply based on the user input. In block 940, each agent of the plurality of agents transmits its reply to the agent manager. In block 950, the agent manager may evaluate the quality of each reply sent from an agent. In an exemplary embodiment, each agent may be configured to transmit a quality score or confidence score along with its reply, based on an algorithm comparing the user input to the information available to the agent. For example in the context of a conversational agent for ordering a pizza, the FAQ agent 324 may have access to information such as a list of pizza toppings, a list of sizes, operating hours, etc., and may return a high confidence score when replying to a user input relevant to these topics. Alternatively, the agent manager may have a dynamic list of which agents to select for providing a response based on previous user feedback. In block 960, the agent manger selects the reply with the best quality rating and transmits it to the user.

In the description above, exemplary embodiments of methods were discussed with reference to various exemplary models and parameters. However, it will be understood that the methods, models, and parameters are not limited to the examples disclosed above. The computer program listings filed concurrently with the application and incorporated by reference provide additional exemplary embodiments illustrating various non-limiting examples of models, parameters and constraints. For example, the appended computer program listings autobot.txt, BMWBaseModels.txt, bmwbodytop_csv.txt, BMWSelectCar_flex.txt, DealerActions.txt provide exemplary embodiments of models, parameters, and constraints that may be used to provide a conversational agent for a car dealership. Additionally, the appended computer program listings allpizza.txt, byopizza.txt, Desserts.txt, Dip.txt, Drinks.txt, Pasta.txt, pizzahutbasemodels.txt, PizzaHutOrderNM.txt, Sides.txt, Wings.txt provide examples of models, parameters, and constraints that may be used to provide a conversational agent for a restaurant.

Additionally, it will be understood that exemplary embodiments of the methods described with reference to FIGS. 5-13 may also be implemented as an artificial intelligence conversational system for interacting with a user to complete a task. The artificial intelligence conversational system may be implemented in any suitable computer environment, including, but not limited to, any of the computing environments discussed with reference to FIG. 1. The system may include a processor and a computer-readable storage medium operably connected to the processor. The computer-readable storage medium may store thereon a task model and a natural language grammar as described above. The processor may be configured to perform one or more of the methods described above with reference to FIGS. 5-13.

Additionally, it will be understood that exemplary embodiments of the methods described with reference to FIGS. 5-13 may also be implemented as a non-transitory computer-readable medium storing computer executable instructions that, when executed by a computer comprising a processor and a computer-readable storage, cause the computer to perform one or more of the methods described above with reference to FIGS. 5-13. The computer-readable medium, processor, and computer-readable storage may be implemented as described above with reference to FIG. 1.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, the claimed features lie in less than all features of a single foregoing disclosed embodiment, configuration, or aspect. Thus, the following claims are hereby incorporated into this Detailed Description, with each claim standing on its own as a separate embodiment of the present disclosure.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method of providing an artificial intelligence conversational agent for interacting with a user, the method comprising:
    declaratively defining a task model of a task using a task modelling language;
    storing the task model in a computer-readable storage medium;

using a machine learning to generate a natural language grammar based on the task model;
storing the natural language grammar in the computer-readable storage medium;
receiving a user input from the user;
interpreting the user input with a processor based on the task model and the natural language grammar;
generating an agent response to the user input with the processor based on the task model; and
communicating the agent response to the user.

2. The method of claim 1, wherein:
the task model comprises a parameter that must be assigned a value in order to complete the task;
the interpreting the user input comprises determining whether the user input includes a user-defined parameter value to be assigned to the parameter; and
the method further comprises, in response to a determination that the user input includes the user-defined parameter value, assigning the user-defined parameter value to the parameter.

3. The method of claim 1, wherein:
the task model comprises a parameter that must be assigned a value in order to complete the task;
the interpreting the user input comprises determining whether the user input includes a user-defined parameter value to be assigned to the parameter; and
the generating the agent response comprises, in response to a determination that the user input does not include the user-defined parameter value, one of a group consisting of:
generating an explanation of why the user input is not relevant to the parameter;
generating a prompt to enter the user-defined parameter value.

4. The method of claim 1, wherein:
the task model comprises a plurality of parameters that must be assigned a value in order to complete the task;
the interpreting the user input comprises determining whether the user input includes a first user-defined parameter value to be assigned to a first parameter of the plurality of parameters; and
the method further comprises, in response to a determination that the user input includes the first user-defined parameter value, assigning the first user-defined parameter value to the first parameter.

5. The method of claim 4, wherein:
the interpreting the user input further comprises determining whether the user input includes a second user-defined parameter value to be assigned to a second parameter of the plurality of parameters; and
the method further comprises, in response to a determination that the user input includes the second user-defined parameter value, assigning the second user-defined parameter value to the second parameter.

6. The method of claim 4, wherein the generating the agent response comprises generating a prompt to enter a second user-defined parameter to be assigned to a second parameter of the plurality of parameters.

7. The method of claim 6, wherein:
the user input is a first user input;
the agent response is a first agent response;
the method further comprises:
receiving a second user input in response to the first agent response;
interpreting the second user input with the processor based on the task model and the natural language grammar;
generating a second agent response to the second user input with the processor based on the task model; and
communicating the second agent response to the user;
the second user input includes a modified first user-defined parameter value assigned to the first parameter;
the method further comprises assigning the modified first user-defined parameter value to the first parameter; and
the generating a second agent response comprises one of a group consisting of:
generating an acknowledgment of the assigning the modified first user-defined parameter value to the first parameter; and
generating a second prompt to enter the second-user defined parameter.

8. The method of claim 1 wherein:
the task model comprises a plurality of parameters that must be assigned a value in order to complete the task;
the method further comprises, before receiving the user input, prompting the user to enter a first user-defined parameter value to be assigned to a first parameter of the plurality of parameters
the interpreting the user input comprises determining whether the user input includes a user question;
the generating the agent response comprises, in response to a determination that the user input includes a user question:
generating a response to the user question; and
generating a prompt to enter the first user-defined parameter value to be assigned to the first parameter.

9. The method of claim 1, wherein:
the task model comprises a plurality of parameters that must be assigned a value in order to complete the task;
the interpreting the user input comprises determining whether the user input includes a user-defined parameter value relevant to any parameter of the plurality of parameters; and
the generating the agent response comprises, in response to a determination that the user input does not include a user-defined parameter value relevant to any parameter of the plurality of parameters, one of a group consisting of:
generating an explanation of why the user input is not relevant to any parameter of the plurality of parameters; and
generating a prompt to enter a first user-defined parameter value relevant to a first parameter of the plurality of parameters.

10. The method of claim 1, wherein:
the task model comprises a plurality of parameters that must be assigned a value in order to complete the task;
the method further comprises, before receiving the user input, prompting the user to enter a first user-defined parameter value to be assigned to a first parameter of the plurality of parameters
the interpreting the user input comprises determining whether the user input includes a second user-defined parameter value to be assigned to a second parameter of the plurality of parameters;
the method further comprises, in response to a determination that the user input comprises the second user-defined parameter value, assigning the second user-defined parameter value to the second parameter of the plurality of parameters; and
the generating the agent response comprises generating a prompt to enter the first user-defined parameter value to be assigned to the first parameter.

11. The method of claim 1, wherein:
the receiving the user input comprises receiving the user input at an agent manager;
the generating an agent response comprises:
- transmitting the interpreted user input to a plurality of secondary conversational agents;
- receiving a plurality of secondary replies from the plurality of secondary conversational agents;
- selecting a selected secondary reply of the plurality of secondary replies;
- setting the selected secondary reply as the agent response.

12. The method of claim 1, wherein:
the task model is a primary task model of a primary task;
the method further comprises declaratively defining a secondary task model of a secondary task using a task modelling language;
the primary task model comprises a plurality of primary parameters that must be assigned a value in order to complete the primary task;
a first primary parameter of the plurality of primary parameters is the secondary task model; and
the secondary task model comprises a plurality of secondary parameters that must be assigned a value in order to complete the secondary task.

13. The method of claim 1, wherein:
the task model comprises a plurality of parameters that must be assigned a value in order to complete the task;
the interpreting the user input comprises assigning values to each parameter of the plurality of parameters for which the user input contains a value; and
the receiving a user input, the interpreting the user input, the generating an agent response, and the communicating the agent response are performed iteratively until a value has been assigned to each parameter of the plurality of parameters.

14. The method of claim 1, wherein the task model is generated based on an external data file.

15. The method of claim 1, wherein the task is a sale of a product or service.

16. The method of claim 15, wherein the task model is generated based on an application programming interface defined by a digital ordering platform for the product or service.

17. The method of claim 1, wherein the task model comprises:
a parameter that must be assigned a value in order to complete the task; and
a constraint limiting a range of values that the parameter can be assigned.

18. The method of claim 1, wherein the task model comprises:
a plurality of parameters that must be assigned a value in order to complete the task; and
a constraint that limits a range of values that can be simultaneously applied to a first parameter of the plurality of parameters and a second parameter of the plurality of parameters.

19. An artificial intelligence conversational system for interacting with a user to complete a task, the system comprising:
a processor;
a computer-readable storage medium operably connected to the processor, the computer-readable storage medium storing therein:
- a task model of the task, the task model being declaratively defined using a task modelling language;
- a natural language grammar based on the task model and generated using machine learning;

wherein the processor is configured to perform:
- receiving a user input from the user;
- interpreting the user input based on the task model and the natural language grammar;
- generating an agent response to the user input based on the task model; and
- communicating the agent response to the user.

20. A non-transitory computer-readable medium storing computer executable instructions for an artificial intelligence conversation agent that, when executed by a computer, cause the computer to perform:
declaratively defining a task model of a task using a task modelling language;
storing the task model in a computer-readable storage medium;
using machine learning to generate a natural language grammar based on the task model;
storing the natural language grammar in the computer-readable storage medium;
receiving a user input from the user;
interpreting the user input with the processor based on the task model and the natural language grammar;
generating an agent response to the user input with the processor based on the task model; and
communicating the agent response to the user.

* * * * *